United States Patent
Iwayama et al.

(10) Patent No.: US 8,525,804 B2
(45) Date of Patent: Sep. 3, 2013

(54) INFORMATION PROCESSING APPARATUS, INFORMATION PROCESSING METHOD, AND INFORMATION PROCESSING PROGRAM

(75) Inventors: Yutaka Iwayama, Kawasaki (JP); Tatsuro Matsumoto, Kawasaki (JP); Kazuo Sasaki, Kawasaki (JP); Manabu Machida, Kawasaki (JP); Masanori Yasunaga, Kawasaki (JP); Hirokazu Miyashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 451 days.

(21) Appl. No.: 12/646,264

(22) Filed: Dec. 23, 2009

(65) Prior Publication Data
US 2010/0097341 A1     Apr. 22, 2010

Related U.S. Application Data

(63) Continuation of application No. PCT/JP2007/063922, filed on Jul. 12, 2007.

(51) Int. Cl.
G06T 7/00      (2006.01)
G06F 3/041     (2006.01)
G06K 9/00      (2006.01)

(52) U.S. Cl.
USPC ....................................................... 345/173

(58) Field of Classification Search
None
See application file for complete search history.

(56) References Cited

U.S. PATENT DOCUMENTS

| 5,448,044 | A  | * | 9/1995  | Price et al. ................... 235/380 |
| 6,272,506 | B1 | * | 8/2001  | Bell ............................. 715/255 |
| 6,421,729 | B1 |   | 7/2002  | Paltenghe et al. |
| 6,661,409 | B2 | * | 12/2003 | Demartines et al. .......... 345/173 |
| 6,757,826 | B1 |   | 6/2004  | Paltenghe |
| 6,970,836 | B1 |   | 11/2005 | Paltenghe et al. |
| 7,200,578 | B2 |   | 4/2007  | Paltenghe et al. |
| 7,694,887 | B2 | * | 4/2010  | Jones et al. ................... 235/492 |
| 2001/0011250 | A1 |  | 8/2001  | Paltenghe et al. |
| 2001/0056410 | A1 |  | 12/2001 | Ishigaki |
| 2002/0004783 | A1 |  | 1/2002  | Paltenghe et al. |
| 2004/0196255 | A1 | * | 10/2004 | Cheng ........................... 345/104 |
| 2005/0111735 | A1 | * | 5/2005  | Sheinin ......................... 382/187 |

FOREIGN PATENT DOCUMENTS

| JP | 2000-036049 | A | 2/2000 |
| JP | 2002-007934 | A | 1/2002 |
| JP | 2002-281279 | A | 9/2002 |

OTHER PUBLICATIONS

International Search Report of PCT/JP2007/063922, mailing date of Aug. 14, 2007.

* cited by examiner

*Primary Examiner* — Joseph Haley
*Assistant Examiner* — Emily Frank
(74) *Attorney, Agent, or Firm* — Westerman, Hattori, Daniels & Adrian, LLP

(57) ABSTRACT

An information processing apparatus is provided with a signature window data generating unit that, by combining template window data stored in a template data storage unit with confirmation note item data and confirmation note content data acquired by a confirmation note data acquiring unit, generates signature window data indicating a signature window on which the confirmation note item data and the confirmation note content data are displayed in at least a portion of an input area, and a signature window display unit that causes a display apparatus to display the signature window indicated by the signature window data generated by the signature window data generating unit.

13 Claims, 30 Drawing Sheets

Customer report slip

To: (Customer Name)   Report date: 2007/05/16
                     Report number: 0705160011R Target device: (Manufacturer's name) Printer XX-YYZZ Work start date/time: 2007/05/16 17:15:00   Work end date/time: 2007/05/16 18:00:00

Work description: Replaced faulty printer part.

Technical fee:   ¥50,000-
Cost of parts:   ¥15,000-
Total amount:    ¥65,000-

Operator's name: Jiro Suzuki   [Sign]   Signature field

FIG. 2

Customer report slip

To: (Customer Name)  Report date: 2007/05/16
 Report number: 0705160011R

Target device: (Manufacturer's name) Printer XX-YYZZ

Work start date/time: 2007/05/16 17:15:00   Work end date/time: 2007/05/16 18:00:00

Work description: Replaced fau...

Signature
Report date:2007/05/16 Report number:0705160011R
Report date:2007/05/16 Report number:0705160011R
Report date:2007/05/16 Report number:0705160011R
Report date:2007/05/16 Report number:0705160011R
Report date:2007/05/16 Report number:0705160011R Technical fee: ¥50,00
Cost of parts: ¥15,00
Total amount: ¥65,00

Done  Cancel  Erase

Operator's name: Jiro Suzuki   Sign

FIG. 4

Customer report slip

To: (Customer Name)

Report date: 2007/05/16
Report number: 0705160011R

Target device: (Manufacturer's name) Printer XX-YYZZ

Work start date/time: 2007/05/16 17:15:00
Work end date/time: 2007/05/16 18:00:00

Work description: Replaced fau...

Technical fee: ¥50,00
Cost of parts: ¥15,00
Total amount: ¥65,00

Operator's name: Jiro Suzuki

[Sign]

Signature

Report date:2007/05/16 Report number:0705160011R
Report date:2007/05/16 Report number:0705160011R
Report date:2007/05/16 Report number:0705160011R
Report date:2007/05/16 Report number:0705160011R
Report date:2007/05/16 Report number:0705160011R

山田太郎

[Done] [Cancel] [Erase]

FIG. 5

Customer report slip

To: (Customer Name)    Report date: 2007/05/16
                       Report number: 0705160011R Target device: (Manufacturer's name) Printer XX-YYZZ Work start date/time: 2007/05/16 17:15:00    Work end date/time: 2007/05/16 18:00:00

Work description: Replaced faulty printer part.

Technical fee:   ¥50,000-
Cost of parts:   ¥15,000-
Total amount:    ¥65,000-

Operator's name: Jiro Suzuki    [Sign] B    Signature field C

```
                    Customer report slip
                    _____

To:(Customer Name)              Report date:    2007/05/16
   _____             Report number:  0705160011R Target device:  (Manufacturer's name) Printer  XX-YYZZ
                _____

Work start                    Work end
  date/time: 2007/05/16 17:15:00  date/time: 2007/05/16 18:00:00

Work description:
                ┌──────────────────────────────────────┐
                │ Replaced fau│      Signature         │
                │             │  ┌──────────────────┐  │
                │             │  │                  │  │
                │             │  │   [face image]   │──┼─ IA
                │             │  │                  │  │
Technical fee:  │     ¥50,00  │  └──────────────────┘  │  }
                │             │                        │  } S
Cost of parts:  │     ¥15,00  │ ┌────┐ ┌──────┐ ┌─────┐│
                │             │ │Done│ │Cancel│ │Erase│┼─ F
Total amount:   │     ¥65,00  │ └────┘ └──────┘ └─────┘│
                └─────────────┴────────────────────────┘
                                      ┌─────┐
Operator's name:  Jiro Suzuki         │Sign │
                  _____         └──┬──┘
                                         B         C
```

FIG. 12

Customer report slip

To: (Customer Name)      Report date: 2007/05/16
     Report number: 0705160011R Target device: (Manufacturer's name) Printer XX-YYZZ Work start date/time: 2007/05/16 17:15:00    Work end date/time: 2007/05/16 18:00:00

Work description: Replaced fau...

Signature

— IA
— S
— F

Technical fee: ¥50,00
Cost of parts: ¥15,00
Total amount: ¥65,00

Done   Cancel   Erase

Operator's name: Jiro Suzuki    Sign

Customer report slip

To:(Customer Name)        Report date:   2007/05/16
                               Report number:   0705160011R Target device: (Manufacturer's name) Printer XX-YYZZ Work start date/time: 2007/05/16 17:15:00     Work end date/time: 2007/05/16 18:00:00

Work description: Replaced faulty printer part.

Technical fee: ¥50,000-
Cost of parts: ¥15,000-
Total amount: ¥65,000-

Operator's name: Jiro Suzuki

Signature field

Customer report slip

To: (Customer Name) _____

Report date: 2007/05/16
Report number: 0705160011R

Target device: (Manufacturer's name) Printer XX-YYZZ

Work start date/time: 2007/05/16 17:15:00
Work end date/time: 2007/05/16 18:00:00

Work description: Replaced fau[...]

Signature

○△■☆○△■☆○△■☆○△■☆○△■☆
○△■☆○△■☆○△■☆○△■☆○△■☆
○△■☆○△■☆○△■☆○△■☆○△■☆
○△■☆○■☆○△■☆○△■☆○△■☆
■☆○△■☆○△■☆○△■☆○△■☆
■☆○△■☆○△■☆○△■☆○△■☆○
○△■☆○△■☆○△■☆○△■☆
○△■☆○△■☆○△■☆
○△■☆
○△■☆○△■☆○△■☆○△■☆
○△■☆
○△■☆○△■☆○△■☆○△■☆
○△■☆
○△■☆○△■☆○△■☆

[Done] [Cancel] [Erase]

Technical fee: ¥50,00
Cost of parts: ¥15,00
Total amount: ¥65,00

Operator's name: Jiro Suzuki   [Sign]

FIG. 18

Customer report slip

To: (Customer Name)

Report date: 2007/05/16
Report number: 0705160011R

Target device: (Manufacturer's name) Printer XX-YYZZ

Work start date/time: 2007/05/16 17:15:00
Work end date/time: 2007/05/16 18:00:00

Work description: Replaced fau[lt]

Signature

Done | Cancel | Erase

Technical fee: ¥50,00
Cost of parts: ¥15,00
Total amount: ¥65,00

Operator's name: Jiro Suzuki | Sign

FIG. 19

Customer report slip

To: (Customer Name)　　　　　　　　　Report date: 2007/05/16
　　　　　　　　　　　　　　　　　　Report number: 0705160011R Target device: (Manufacturer's name) Printer XX-YYZZ Work start date/time: 2007/05/16 17:15:00　　Work end date/time: 2007/05/16 18:00:00

Work description: Replaced fau...

Signature

Technical fee: ¥50,00...
Cost of parts: ¥15,00...　　Done　Cancel　Erase
Total amount: ¥65,00...

Operator's name: Jiro Suzuki　　Sign

INFORMATION PROCESSING APPARATUS, INFORMATION PROCESSING METHOD, AND INFORMATION PROCESSING PROGRAM

CROSS-REFERENCE TO RELATED APPLICATIONS

This application is based upon and claims the benefit of priority of the prior International Patent Application No. PCT/JP2007/063922, filed on 12 Jul. 2007, the entire contents of which are incorporated herein by reference.

FIELD

The present invention relates to an information processing apparatus connected to a display apparatus and an input apparatus, and to which a handwritten signature on a confirmation note displayed by the display apparatus is input via the input apparatus, an information processing method, and an information processing program.

BACKGROUND

Recent commercial mobile information terminals such as HHTs (Hand Held Terminal) and PDAs (Personal Digital Assistant) have a function of displaying a signature window that includes an input area and enabling a user to make a handwritten signature in the input area of the displayed signature window, in addition to a function of generating and displaying a report slip for work requested by the user, for example (e.g., see Japanese Patent Application Laid-Open Nos. 2002-7934 and 2000-36049).

Specifically, when an operator pushes a Sign button on the window on which the report slip is displayed, a signature window that includes an input area is displayed as a pop-up. The user, in the case of judging that the contents of the report slip are correct, can electronically make a handwritten signature, by using a touch pen, for example, in the input area of the signature window. When the user or the operator presses a Done button on the signature window after the handwritten signature is finished, the user's handwritten signature displayed in the input area of the signature window and a signature field of the report slip displayed on the window are combined. As a result, a report slip in which the user's handwritten signature is combined with the signature field is generated.

Such electronic handwritten signatures are made by users in various situations besides the above process of confirming a work report slip, such as a process of confirming a statement slip for a product that a user has purchased using a credit card, or a process of receiving courier delivery, for example.

However, problems such as the following exist when a user makes a handwritten signature in the input area of the above conventional signature window.

That is, users have been concerned about misuse by a third party as a result of the signature portion, in the case of having made a handwritten signature, being saved as electronic data, and the signature portion saved as electronic data being duplicated or edited. Concerned users have also felt a psychological resistance to handwritten signatures themselves, and, consequently, actually refused to make a handwritten signature.

SUMMARY

An information processing apparatus disclosed in this application is an information processing apparatus connected to a display apparatus and an input apparatus and to which a handwritten signature on a confirmation note displayed by the display apparatus is input via the input apparatus, including a confirmation note data storage unit that stores confirmation note data indicating the confirmation note, a confirmation note window display unit that causes the display apparatus to display a confirmation note window on which the confirmation note is displayed, based on the confirmation note data stored in the confirmation note data storage unit, a template data storage unit storing template window data indicating a template window that includes an input area to which the handwritten signature is input via the input apparatus, a data acquiring unit that acquires element data of at least a portion of elements forming the confirmation note, or associated image data indicating an image associated with the confirmation note or a user that makes the handwritten signature, a signature window data generating unit that, by combining the template window data with the element data or the associated image data acquired by the data acquiring unit, generates signature window data indicating a signature window on which the element data or the associated image data is displayed in at least a portion of the input area, and a signature window display unit that causes the display apparatus to display the signature window indicated by the signature window data generated by the signature window data generating unit.

The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 2 illustrates an example of a confirmation note window displayed by a display apparatus.

FIG. 4 illustrates an example of a signature window displayed on the above confirmation note window.

FIG. 5 illustrates an example of the signature window illustrated in FIG. 4 in the case of a user having made a handwritten signature via an input apparatus.

FIG. 6 illustrates an example of a confirmation note window in which the user's handwritten signature is combined with a signature field of a report slip.

FIG. 12 illustrates an example of a signature window displayed on the confirmation note window.

FIG. 14 illustrates an example of the signature window illustrated in FIG. 12 in the case of a user having made a handwritten signature via an input apparatus.

FIG. 16 illustrates an example of a confirmation note window displayed by a display apparatus.

FIG. 18 illustrates an example of a signature window displayed on the above confirmation note window.

FIG. 19 illustrates an example of a signature window displayed on the above confirmation note window.

FIG. 23 illustrates an example of a signature window displayed on a confirmation note window.

FIG. 24 illustrates an example of an input area of a signature window on which a mask surrounding a written portion of a handwritten signature in the case of a user having made a handwritten signature via an input apparatus is removed, and confirmation note item data and confirmation note content data that were masked are displayed.

DESCRIPTION OF EMBODIMENTS

Figure 1:
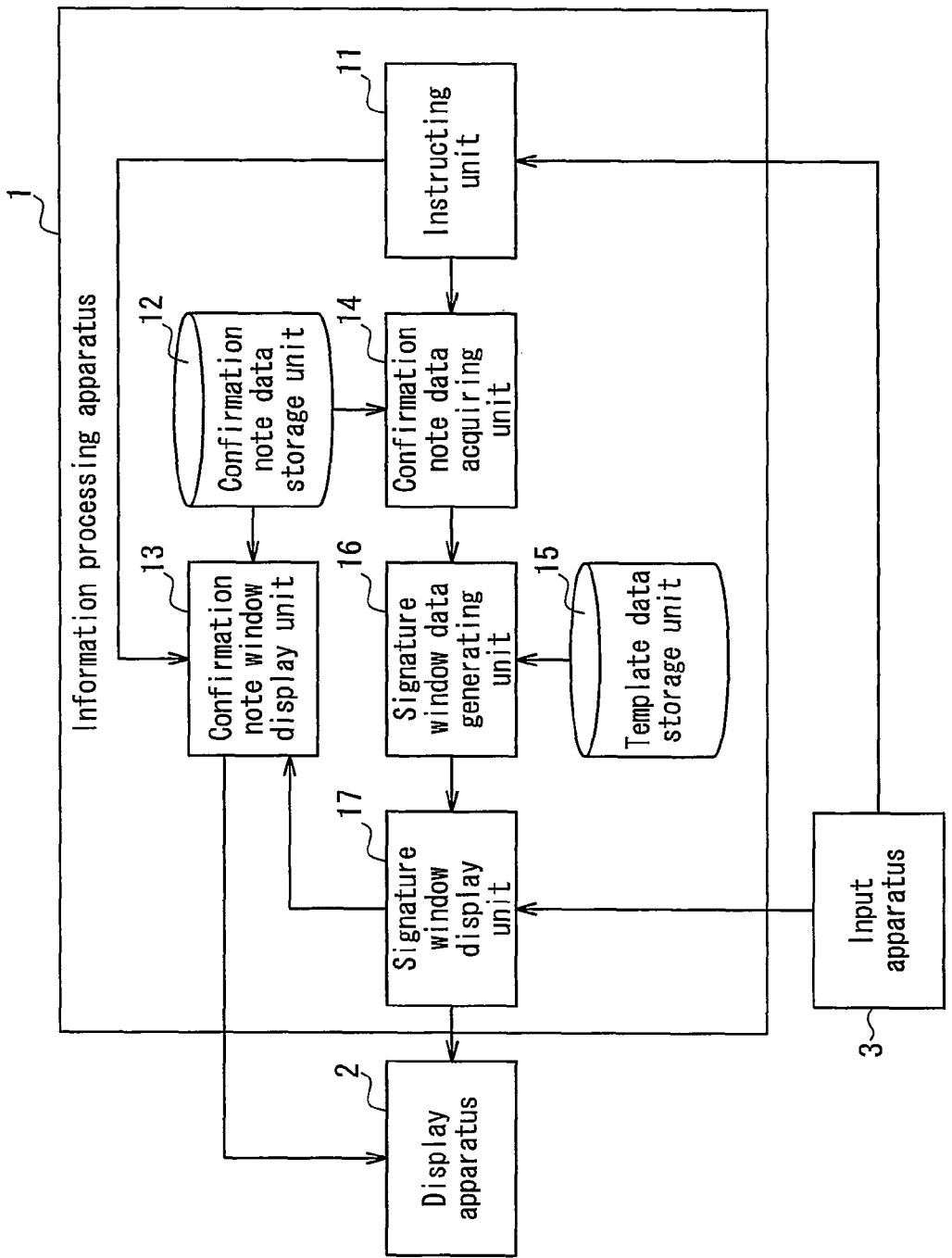
FIG. 1 is a block diagram illustrating a schematic configuration of an information processing apparatus according to a first embodiment of the present invention.

According to the above information processing apparatus of the present embodiment, the signature window data generating unit, by combining template window data with element data or associated image data, generates signature window data indicating a signature window on which element data or associated image data is displayed in at least a portion of an input area. Note that element data is data of at least a portion of elements forming a confirmation note. Associated image data is data indicating an image associated with a confirmation note or a user that makes a handwritten signature. The signature window display unit causes the display apparatus to display the signature window indicated by the signature window data. In other words, because element data or associated image data is displayed in at least a portion of the input area, when a user makes a handwritten signature in the input area of the signature window, the user is able to easily comprehend that this handwritten signature is a once only signature on the confirmation note. That is, the user will feel that there is no danger of a signature portion, in the case of having made a handwritten signature, being saved as electronic data, and the signature portion saved as electronic data being duplicated or edited. Therefore, the psychological resistance of users that make a handwritten signature can be reduced. As a result, it is possible to resolve the concern of users that make a handwritten signature.

Note that a confirmation note is a document for confirmation by a user, and includes, for example, various types of slips, an approval document, the minutes of a meeting, a contract, a memorandum, and a notification form, besides various types of reports for a user, an expense statement for a user, and a receipt of courier delivery for a user.

With the above information processing apparatus of the present invention, preferably the signature window data generating unit generates signature window data indicating a signature window on which the element data or the associated image data is displayed on a background window of the input area.

According to the above configuration, the signature window data generating unit generates signature window data indicating a signature window on which element data or associated image data is displayed on a background window of the input area. In other words, because element data or associated image data is displayed on a background window of the input area, in the case where a user makes a handwritten signature in the input area of the signature window, this signature is displayed on the element data or associated image data displayed on the background window of the input area. In the case where a signature portion is saved as electronic data, the saved electronic data will be element data or associated image data that includes the signature portion. In other words, the user will feel that there is no danger of the signature portion saved as electronic data being duplicated or edited. Therefore, the psychological resistance of users that make a handwritten signature can be reduced. As a result, it is possible to resolve the concern of users that make a handwritten signature.

In order to attain the above object, an information processing apparatus of the present invention is an information processing apparatus connected to a display apparatus and an input apparatus and to which a handwritten signature on a confirmation note displayed by the display apparatus is input via the input apparatus, including a confirmation note data storage unit that stores confirmation note data indicating the confirmation note, a confirmation note window display unit that causes the display apparatus to display a confirmation note window on which the confirmation note is displayed, based on the confirmation note data stored in the confirmation note data storage unit, a template data storage unit storing template window data indicating a template window that includes an input area to which the handwritten signature is input via the input apparatus, a data acquiring unit that acquires element data of at least a portion of elements forming the confirmation note, or associated image data indicating an image associated with the confirmation note or a user that makes the handwritten signature, a signature window data generating unit that, by inserting the element data or the associated image data acquired by the data acquiring unit into the template window data, generates signature window data indicating a signature window on which the element data or the associated image data is displayed in a written portion of the signature or surrounding a written portion of the signature in a case of the handwritten signature having been input via the input apparatus, and a signature window display unit that causes the display apparatus to display the signature window indicated by the signature window data generated by the signature window data generating unit.

According to the above information processing apparatus of the present invention, the signature window data generating unit, by inserting element data or associated image data into template window data, generates signature window data indicating a signature window on which element data or associated image data is displayed in a written portion of the signature or surrounding a written portion of the signature in the case of the handwritten signature having been input via an input apparatus. The signature window display unit causes the display apparatus to display the signature window indicated by the signature window data. In other words, because element data or associated image data is displayed in a written portion of the signature or surrounding a written portion of the signature in the case of a handwritten signature having been input, when a user makes a handwritten signature in the input area of the signature window, the user is able to easily comprehend that this handwritten signature is a once only signature on the confirmation note. That is, the user will feel that there is no danger of a signature portion, in the case of having made a handwritten signature, being saved as electronic data, and the signature portion saved as electronic data being duplicated or edited. Therefore, the psychological resistance of users that make a handwritten signature can be reduced. As a result, it is possible to resolve the concern of users that make a handwritten signature.

With the above information processing apparatus of the present invention, preferably the element data is input via the input apparatus, and is confirmation note content data indicating a content of the confirmation note.

According to the above configuration, element data is data input via the input apparatus. That is, element data is confirmation note content data indicating a content of the confirmation note. When a user makes a handwritten signature in an input area of a signature window, the user is thus able to easily comprehend that this handwritten signature is a once only signature on the confirmation note.

With the above information processing apparatus of the present invention, preferably the element data is inserted into the confirmation note data, and is confirmation note identification data uniquely associated with the confirmation note.

According to the above configuration, element data is data inserted into the confirmation note data. That is, element data is confirmation note identification data uniquely associated with the confirmation note. When a user makes a handwritten signature in the input area of the signature window, the user is thus able to easily comprehend that this handwritten signature is a once only signature on the confirmation note.

The above information processing apparatus of the present invention preferably further includes an image data storage unit that stores associated image data indicating an image imaged of a creator of the confirmation note, and the data acquiring unit preferably acquires the associated image data stored in the image data storage unit.

According to the above configuration, associated image data indicating an image imaged of a creator of the confirmation note is stored in an image data storage unit. The data acquiring unit acquires the associated image data stored in the image data storage unit. The signature window data generating unit is thereby capable of generating signature window data indicating a signature window on which the acquired associated image data is displayed in at least a portion of the input area, or a signature window on which the acquired associated image data is displayed in a written portion of a signature or surrounding a written portion of a signature in the case of a handwritten signature having been input via the input apparatus.

In order to attain the above object, an information processing method of the present invention is an information processing method executed by a computer connected to a display apparatus and an input apparatus and to which a handwritten signature on a confirmation note displayed by the display apparatus is input via the input apparatus, including a confirmation note window display step in which a confirmation note window display unit provided in the computer causes the display apparatus to display a confirmation note window on which the confirmation note is displayed, based on confirmation note data stored in a confirmation note data storage unit that stores confirmation note data indicating the confirmation note, a data acquiring step in which a data acquiring unit provided in the computer acquires element data of at least a portion of elements forming the confirmation note, or associated image data indicating an image associated with the confirmation note or a user that makes the handwritten signature, a signature window data generating step in which a signature window data generating unit provided in the computer, by combining template window data stored in a template data storage unit storing template window data indicating a template window that includes an input area to which the handwritten signature is input via the input apparatus with the element data or the associated image data acquired in the data acquiring step, generates signature window data indicating a signature window on which the element data or the associated image data is displayed in at least a portion of the input area, and a signature window display step in which a signature window display unit provided in the computer causes the display apparatus to display the signature window indicated by the signature window data generated in the signature window data generating step.

In order to attain the above object, an information processing method of the present invention is an information processing method executed by a computer connected to a display apparatus and an input apparatus and to which a handwritten signature on a confirmation note displayed by the display apparatus is input via the input apparatus, including a confirmation note window display step in which a confirmation note window display unit provided in the computer causes the display apparatus to display a confirmation note window on which the confirmation note is displayed, based on confirmation note data stored in a confirmation note data storage unit that stores confirmation note data indicating the confirmation note, a data acquiring step in which a data acquiring unit provided in the computer acquires element data of at least a portion of elements forming the confirmation note, or associated image data indicating an image associated with the confirmation note or a user that makes the handwritten signature, a signature window data generating step in which a signature window data generating unit provided in the computer, by inserting the element data or the associated image data acquired in the data acquiring step into template window data stored in a template data storage unit storing template window data indicating a template window that includes an input area to which the handwritten signature is input via the input apparatus, generates signature window data indicating a signature window on which the element data or the associated image data is displayed in a written portion of the signature or surrounding a written portion of the signature in a case of the handwritten signature having been input via the input apparatus, and a signature window display step in which a signature window display unit provided in the computer causes the display apparatus to display the signature window indicated by the signature window data generated in the signature window data generating step.

In order to attain the above object, an information processing program of the present invention is an information processing program for causing a computer connected to a display apparatus and an input apparatus and to which a handwritten signature on a confirmation note displayed by the display apparatus is input via the input apparatus to execute processing including a confirmation note window display process of causing the display apparatus to display a confirmation note window on which the confirmation note is displayed, based on confirmation note data stored in a confirmation note data storage unit that stores confirmation note data indicating the confirmation note, a data acquiring process of acquiring element data of at least a portion of elements forming the confirmation note, or associated image data indicating an image associated with the confirmation note or a user that makes the handwritten signature, a signature window data generating process of, by combining template window data stored in a template data storage unit storing template window data indicating a template window that includes an input area to which the handwritten signature is input via the input apparatus with the element data or the associated image data acquired in the data acquiring process, generating signature window data indicating a signature window on which the element data or the associated image data is displayed in at least a portion of the input area, and a signature window display process of causing the display apparatus to display the signature window indicated by the signature window data generated in the signature window data generating process.

In order to attain the above object, an information processing program of the present invention is an information processing program for causing a computer connected to a display apparatus and an input apparatus and to which a handwritten signature on a confirmation note displayed by the display apparatus is input via the input apparatus to execute processing including a confirmation note window display process of causing the display apparatus to display a confirmation note window on which the confirmation note is displayed, based on confirmation note data stored in a confirmation note data storage unit that stores confirmation note data indicating the confirmation note, a data acquiring process of acquiring element data of at least a portion of elements forming the confirmation note, or associated image data indicating an image associated with the confirmation note or a user that makes the handwritten signature, a signature window data generating process of, by inserting the element data or the associated image data acquired in the data acquiring process into template window data stored in a template data storage unit storing template window data indicating a template window that includes an input area to which the handwritten signature is input via the input apparatus, generating signature window data indicating a signature window on which the element data or the associated image data is displayed in a written portion of the signature or surrounding a written portion of the signature in a case of the handwritten signature having been input via the input apparatus, and a signature window display process of causing the display apparatus to display the signature window indicated by the signature window data generated in the signature window data generating process.

Note that the information processing methods and the information processing programs of the present invention obtain a similar effect to the above information processing apparatuses.

As described above, an information processing apparatus, an information processing method, and an information processing program of the present invention achieve the effect of being able to resolve the concern of a user that makes a handwritten signature, by displaying data relating to a confirmation note or the user in at least a portion of an input area of a signature window, or in a written portion of the signature or surrounding a written portion of the signature in the case of the handwritten signature having been input via an input apparatus.

Hereinafter, specific embodiments of the present invention will be described in detail with reference to the drawings.

Embodiment 1

FIG. 1 is a block diagram illustrating a schematic configuration of an information processing apparatus 1 according to the present embodiment. The information processing apparatus 1 illustrated in FIG. 1 is connected to a display apparatus 2 and an input apparatus 3. Note that a mobile terminal according to the present embodiment includes the information processing apparatus 1, the display apparatus 2 and the input apparatus 3 of FIG. 1. The mobile terminal is a commercial mobile information terminal such as an HHT or a PDA. Note that the mobile terminal may be a note personal computer, a tablet personal computer, or the like. The display apparatus 2 is constituted by a liquid crystal display, an organic EL display, a plasma display, a CRT display, or the like. The input apparatus 3 is, for example, constituted by a touch panel formed on a front surface of the display apparatus 2. An analog resistive film touch panel having a high resolution, for example, preferably is used for the touch panel. Also, the input apparatus 3 is provided with a function of a touch panel controller, and converts an output voltage of the touch panel to input position information. Note that the input apparatus 3 may be a tablet, a digitizer, a mouse, a keyboard, a voice recognition apparatus or the like, instead of a touch panel.

Note that in the present embodiment, the case where a printer belonging to a user breaks down and the user requests the manufacturer to repair the faulty printer is described as an example. Specifically, the case is described where an operator (customer engineer) is dispatched to the user's location from the manufacturer that received the request, and the operator generates a report slip for the user using a mobile terminal, after repairing the faulty printer.

That is, the information processing apparatus 1 illustrated in FIG. 1 is provided with an instructing unit 11, a confirmation note data storage unit 12, a confirmation note window display unit 13, a confirmation note data acquiring unit 14, a template data storage unit 15, a signature window data generating unit 16, and a signature window display unit 17.

The instructing unit 11 receives an instruction from the operator or the user input via the input apparatus 3.

The confirmation note data storage unit 12 stores confirmation note data that includes confirmation note item data indicating a confirmation note item, and confirmation note content data indicating a confirmation note content corresponding to the confirmation note item. Note that confirmation note item data, confirmation note content data, or confirmation note data is one embodiment of element data of the present invention. In the present embodiment, confirmation note data indicating the report slip for the user is stored in the confirmation note data storage unit 12. The confirmation note data is generated as a result of the operator inputting the contents of the confirmation note via the input apparatus 3, and is stored in the confirmation note data storage unit 12, as a result of the operator pressing a Done button, for example. Note that one piece of confirmation note data or a plurality of pieces of confirmation note data may be stored in the confirmation note data storage unit 12.

The confirmation note window display unit 13, in the case where an instruction has been received from the instructing unit 11 to display a confirmation note window on which the confirmation note is displayed, extracts confirmation note data stored in the confirmation note data storage unit 12. The confirmation note window display unit 13 causes the display apparatus 2 to display a confirmation note window, based on the extracted confirmation note data. FIG. 2 illustrates an example of a confirmation note window T displayed by the display apparatus 2. As illustrated in FIG. 2, the report slip for the user is displayed on the confirmation note window T. Specifically, the confirmation note items "Report Date", "Report Number", "Target Device", "Work Start Date/Time", "Work End Date/Time", "Work Description", "Technical Fee", "Cost of Parts", "Total Amount", and "Operator's Name" are displayed on the confirmation note window T. Also, the confirmation note contents are respectively displayed on the confirmation note window T in correspondence with the confirmation note items For example, the confirmation note content "(Manufacturer's Name) Printer XX-YYZZ" is displayed in correspondence with the confirmation note item "Target Device". Further, a Sign button B and a signature field C are displayed on the confirmation note window T.

The confirmation note data acquiring unit (data acquiring unit) 14, in the case where an instruction has been received from the instructing unit 11 to cause the display apparatus 2 to display the signature window, extracts confirmation note data stored in the confirmation note data storage unit 12. In the present embodiment, the confirmation note data acquiring unit 14 extracts confirmation note data stored in the confirmation note data storage unit 12, in the case where the Sign button B illustrated in FIG. 2 has been pressed by the operator. The confirmation note data acquiring unit 14 acquires prescribed confirmation note item data and confirmation note content data from the extracted confirmation note data, in accordance with a predetermined acquisition criterion. Note that, in the present embodiment, the predetermined acquisition criterion is a criterion for acquiring the confirmation note item data "Report Date" and the confirmation note content data corresponding to this confirmation note item, and the confirmation note item data "Report Number" and the confirmation note content data corresponding to this confirmation note item. The confirmation note data acquiring unit 14 outputs the acquired confirmation note item data and confirmation note content data to the signature window data generating unit 16. Note that the above acquisition criterion is prestored in a memory (not illustrated) of the confirmation note data acquiring unit 14.

Note that in the above, an example is described in which the confirmation note data acquiring unit 14 acquires prescribed confirmation note item data and confirmation note content data from extracted confirmation note data, in accordance with a predetermined acquisition criterion, but the present invention is not limited to this. For example, the confirmation note data acquiring unit 14 may be configured to acquire only prescribed confirmation note content data from extracted confirmation note data, in accordance with a predetermined acquisition criterion.

Figure 3:
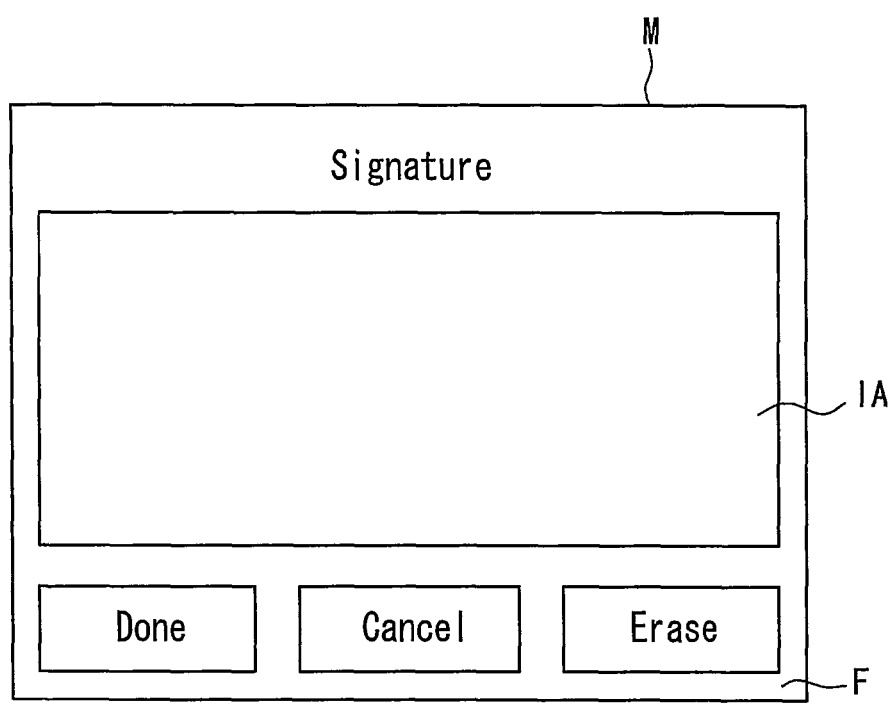
FIG. 3 illustrates an example of a template window indicated by template window data stored in a template window data storage unit in the above information processing apparatus.

The template data storage unit 15 stores template window data indicating a template window that includes an input area to which a handwritten signature is input via the input apparatus 3. FIG. 3 illustrates an example of a template window M indicated by template window data stored in the template data storage unit 15. As illustrated in FIG. 3, the template window M has an input area IA to which a handwritten signature is input by the user via the input apparatus 3, and a signature frame area F that includes a "Done" button, a "Cancel" button and an "Erase" button. Note that the input area IA of the template window M has a plain background.

The signature window data generating unit 16 combines the template window data stored in the template data storage unit 15 with the confirmation note item data and the confirmation note content data output from the confirmation note data acquiring unit 14. In the present embodiment, the signature window data generating unit 16 combines the template window M illustrated in FIG. 3 with both the confirmation note item data "Report Date" and the confirmation note content data "2007/05/16" and the confirmation note item data "Report Number" and the confirmation note content data "0705160011R". As a result of the combining, the signature window data generating unit 16 generates signature window data indicating a signature window on which conformation note item data and confirmation note content data are displayed on a background window of the input area IA. The signature window data generating unit 16 outputs the generated signature window data to the signature window display unit 17.

The signature window display unit 17 causes the display apparatus 2 to display the signature window indicated by the signature window data output from the signature window data generating unit 16. FIG. 4 illustrates an example of a signature window S displayed on the confirmation note window T. As illustrated in FIG. 4, the signature window S is displayed as a pop-up on the confirmation note window T displayed by the display apparatus 2. Also, the signature window S has an input area IA to which a handwritten signature is input by the user via the input apparatus 3, and a signature frame area F that includes a "Done" button, a "Cancel" button and an "Erase" button. Further, both the confirmation note item data "Report Date" and the confirmation note content data "2007/05/16" and the confirmation note item data "Report Number" and the confirmation note content data "0705160011R" are displayed successively on a background window of the input area IA.

Here, the user, in the case of judging that the contents of the report slip displayed on the confirmation note window T are correct, makes a handwritten signature via the input apparatus 3, by drawing a trajectory using a touch pen, for example, in the input area IA of the signature window S. In the case where the user has made a handwritten signature via the input apparatus 3, the signature window display unit 17 causes the display apparatus 2 to display the handwritten signature in accordance with the trajectory that the user has drawn in the input area IA of the signature window S. FIG. 5 illustrates an example of the signature window S in the case of the user having made a handwritten signature via the input apparatus 3. As illustrated in FIG. 5, the handwritten signature "Taro Yamada" is displayed in the input area IA of the signature window S.

Also, the confirmation note window display unit 13, in the case where an instruction has been received from the instructing unit 11 to combine the handwritten signature displayed in the input area IA of the signature window S, combines the user's handwritten signature displayed in the input area IA of the signature window S and the signature field C of the report slip displayed on the confirmation note window T. In the present embodiment, the confirmation note window display unit 13 combines the user's handwritten signature displayed in the input area IA of the signature window S and the signature field C of the report slip displayed on the confirmation note window T, in the case where the "Done" button of the signature window S illustrated in FIG. 5 has been pressed by the user or the operator. The confirmation note window display unit 13 causes the display apparatus 2 to display the confirmation note window T on which the user's handwritten signature is combined with the signature field C of the report slip FIG. 6 illustrates an example of the confirmation note window Tin which the user's handwritten signature is combined with the signature field C of the report slip. As illustrated in FIG. 6, the user's handwritten signature displayed in the input area IA of the signature window S is combined with the signature field C of the confirmation note window T.

Incidentally, the above information processing apparatus 1 is realized by installing a program on an arbitrary computer such as a personal computer. That is, the instructing unit 11, the confirmation note window display unit 13, the confirmation note data acquiring unit 14, the signature window data generating unit 16, and the signature window display unit 17 are embodied by a CPU of a computer operating in accordance with a program that realizes the functions these constituent elements. Accordingly, a program for realizing the functions of the instructing unit 11, the confirmation note window display unit 13, the confirmation note data acquiring unit 14, the signature window data generating unit 16 and the signature window display unit 17, or a recording medium having the program recorded thereon is also one embodiment of the present invention. Also, the confirmation note data storage unit 12 and the template data storage unit 15 are embodied by a storage apparatus integrated into a computer or a storage apparatus accessible from this computer.

Next, the operation of the information processing apparatus 1 according to the above configuration will be described with reference to FIG. 7.

Figure 7:
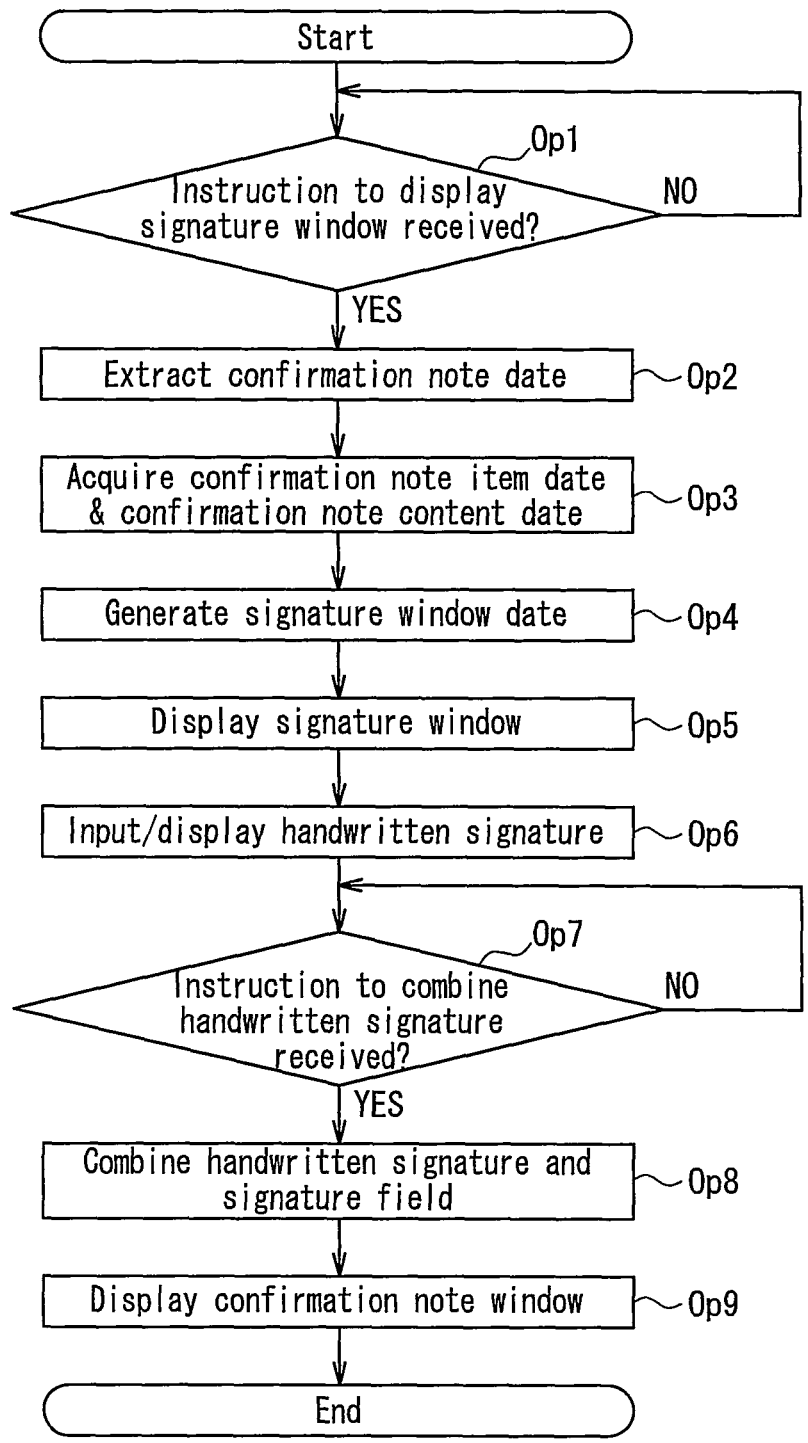
FIG. 7 is a flowchart illustrating an example of an operation of the above information processing apparatus.

FIG. 7 is a flowchart illustrating an example of the operation of the information processing apparatus 1. That is, as illustrated in FIG. 7, in the case where an instruction has been received from the instructing unit 11 to cause the display apparatus 2 to display the signature screen (YES at Op1), or in other words, in the case where the Sign button B illustrated in FIG. 2 has been pressed by the operator, the confirmation note data acquiring unit 14 extracts confirmation note data stored in the confirmation note data storage unit 12 (Op2). On the other hand, in the case where an instruction has not been received from the instructing unit 11 to cause the display apparatus 2 to display the signature screen (NO at Op1), or in other words, in the case where the Sign button B illustrated in FIG. 2 has not been pressed by the operator, the confirmation note data acquiring unit 14 returns to Op1.

The confirmation note data acquiring unit 14 acquires prescribed confirmation note item data and confirmation note content data from the confirmation note data extracted at Op2, in accordance with the predetermined acquisition criterion (Op3). In the present embodiment, the confirmation note data acquiring unit 14 acquires both the confirmation note item data "Report Date" and the confirmation note item content data "2007/05/16" and the confirmation note item data "Report Number" and the confirmation note content data "0705160011R" from the confirmation note data extracted at Op2.

The signature window data generating unit 16 combines the template window data stored in the template data storage unit 15 with the confirmation note item data and the confirmation note content data acquired at Op3. As a result of the combining, the signature window data generating unit 16 generates signature window data indicating a signature window on which the confirmation note item data and the confirmation note content data are displayed on the background window of the input area IA (Op4). The signature window display unit 17 causes the display apparatus 2 to display the signature window S illustrated by the signature window data generated at Op4 (Op5).

Here, the user, in the case of judging that the contents of the report slip displayed on the confirmation note window T are correct, makes a handwritten signature via the input apparatus 3, by drawing a trajectory using a touch pen, for example, in the input area IA of the signature window S. In the case where the user has made a handwritten signature via the input apparatus 3, the signature window display unit 17 causes the display apparatus 2 to display the handwritten signature in accordance with the trajectory that the user has drawn in the input area IA of the signature window S (Op6).

The confirmation note window display unit 13, in the case where an instruction has been received from the instructing unit 11 to combine the handwritten signature displayed in the input area IA of the signature window S (YES at Op7), or in other words, in the case where the "Done" button illustrated in FIG. 5 has been pressed by the user or the operator, combines the user's handwritten signature displayed in the input area IA of the signature window S and the signature field C of the report slip displayed on the confirmation note window T (Op8). The confirmation note window display unit 13 causes the display apparatus 2 to display the confirmation note window T on which the user's handwritten signature is combined with the signature field C of the report slip (Op9). On the other hand, the confirmation note window display unit 13, in the case where an instruction has not been received from the instructing unit 11 to combine the handwritten signature displayed in the input area IA of the signature window S (NO at Op7), or in other words, in the case where the "Done" button illustrated in FIG. 5 has not been pressed by the user or the operator, returns to Op7.

As described above, according to the information processing apparatus 1 of the present embodiment, the signature window data generating unit 16, by combining template window data with confirmation note item data and confirmation note content data, generates signature window data indicating a signature window S on which the conformation note item data and the confirmation note content data are displayed on a background window of an input area IA. The signature window display unit 17 causes the display apparatus 2 to display the signature window S indicated by the signature window data. In other words, because confirmation note item data and confirmation note content data are displayed on the background window of the input area IA, when a user makes a handwritten signature in the input area IA of the signature window S, the user is able to easily comprehend that this handwritten signature is a once only signature on the confirmation note. That is, the user will feel that there is no danger of a signature portion, in the case of having made a handwritten signature, being saved as electronic data, and the signature portion saved as electronic data being duplicated or edited. Therefore, the psychological resistance of users that make a handwritten signature can be reduced. As a result, it is possible to resolve the concern of users that make a handwritten signature.

Note that the above specific example is merely a preferred embodiment of an information processing apparatus according to the present embodiment, and a variety of modifications are possible, for example, with regard to the signature window that the signature window display unit causes the display apparatus to display.

First Variation of Signature Window

Figure 8:
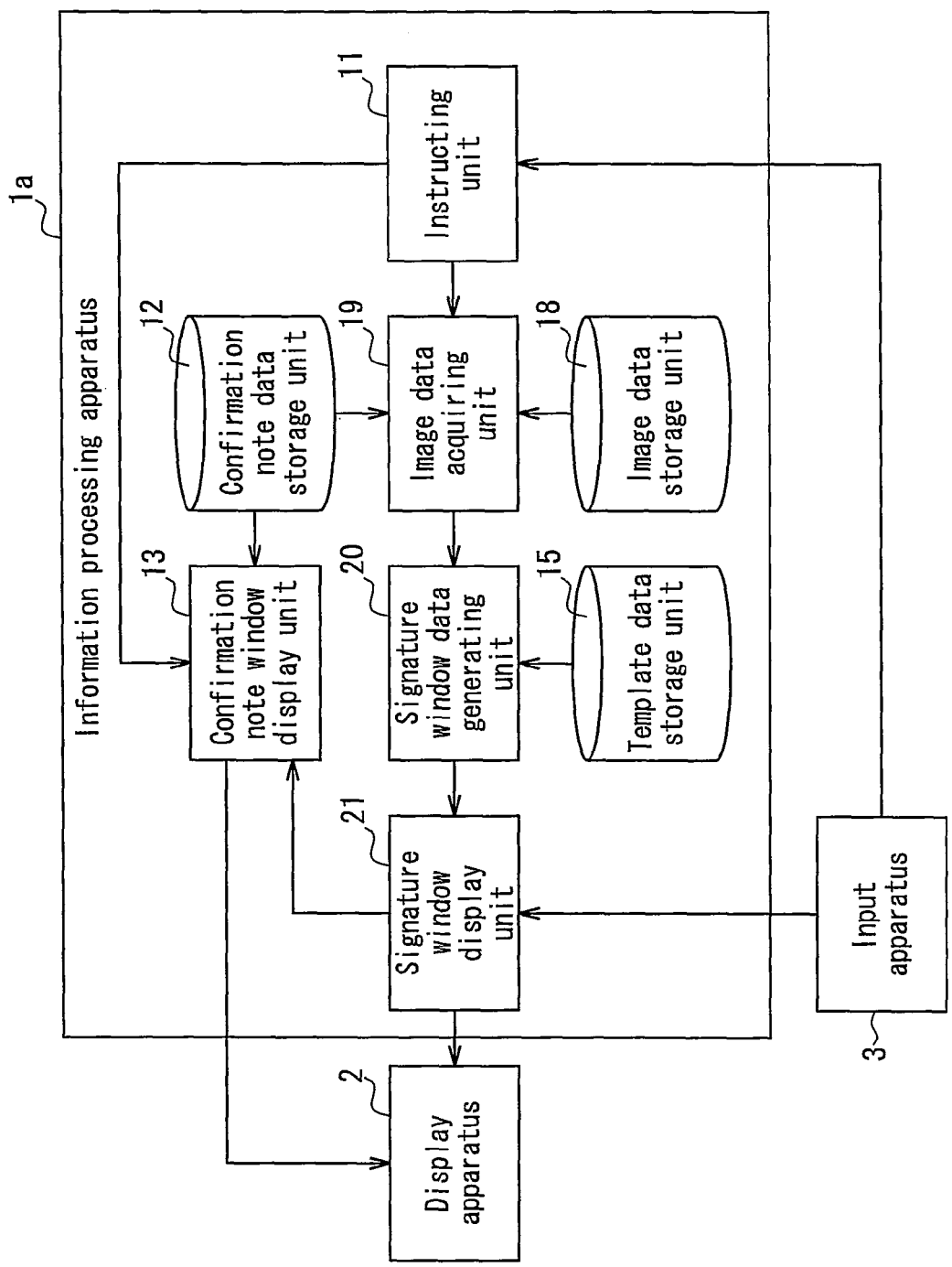
FIG. 8 is a block diagram illustrating a schematic configuration of an information processing apparatus according to a first variation of the present invention.

FIG. 8 is a block diagram illustrating a schematic configuration of an information processing apparatus 1a according to the first variation. That is, the information processing apparatus 1a according to the first variation is provided with an image data storage unit 18, in addition to the information processing apparatus 1 illustrated in FIG. 1. Also, the information processing apparatus 1a according to the first variation is provided with an image data acquiring unit 19, instead of the confirmation note data acquiring unit 14 illustrated in FIG. 1. Further, the information processing apparatus 1a according to the first variation is provided with a signature window data generating unit 20 and a signature window display unit 21, instead of the signature window data generating unit 16 and the signature window display unit 17 illustrated in FIG. 1. Note that in FIG. 8, the same reference numerals are given to constituent elements having similar functions to FIG. 1, and a detailed description thereof will be omitted.

Figure 9:
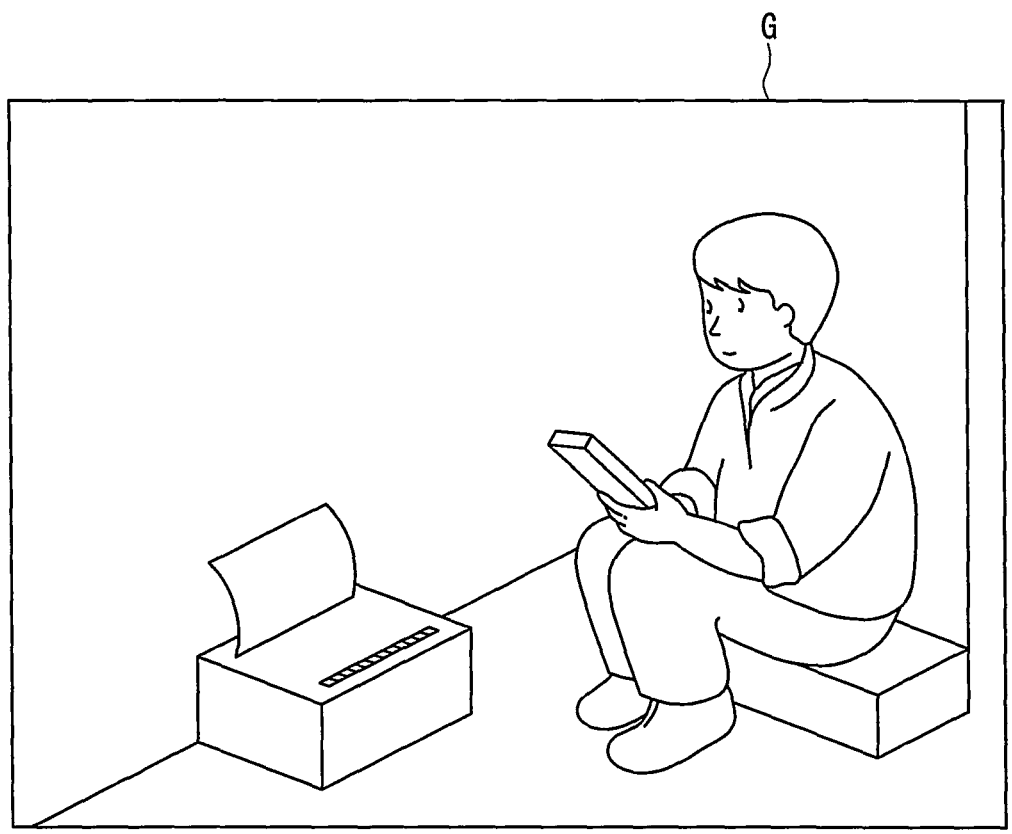
FIG. 9 illustrates an example of associated image data stored in an image data storage unit of the above information processing apparatus.
Figure 10:
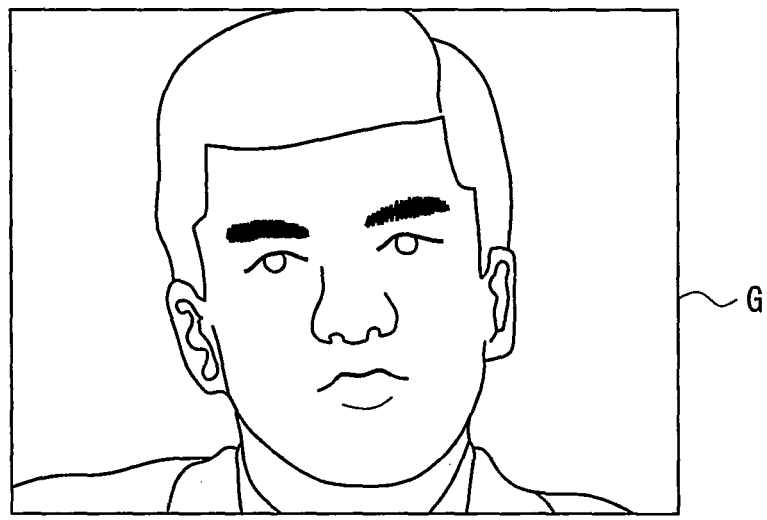
FIG. 10 illustrates an example of associated image data stored in an image data storage unit of the above information processing apparatus.

The image data storage unit 18 stores associated image data indicating a still image associated with a confirmation note or a user that makes a handwritten signature. FIG. 9 and FIG. 10 illustrate examples of associated image data G stored in the image data storage unit 18. As illustrated in FIG. 9, associated image data G representing a state where an operator is (in the process of) repairing the faulty printer is stored the image data storage unit 18. Also, as illustrated in FIG. 10, associated image data G representing the operator's face is stored in the image data storage unit 18. Associated image data G stored in the image data storage unit 18 is generated as a result of the user imaging an object using a digital camera, for example. Note that this digital camera also includes a mobile telephone with a camera function, besides a normal digital camera. Specifically, the user connects the digital camera and the mobile terminal after imaging an object using the digital camera. Associated image data G is stored in the image data storage unit 18, by transferring associated image data G that has been imaged from the digital camera to the mobile terminal. Note that associated image data G of the user's pet (e.g., dog, cat) or associated image data G of something in the user's possession (e.g., car, clothes) may be stored in the image data storage unit 18, as a result of the user imaging his or her pet or something in his or her possession using a digital camera.

Note that in the above, an example is described in which associated image data G indicating a still image associated with a confirmation note or a user that makes a handwritten signature is stored in the image data storage unit 18, but the present invention is not limited to this. For example, associated image data G indicating a moving image associated with a confirmation note or a user that makes a handwritten signature may be stored in the image data storage unit 18.

The image data acquiring unit (data acquiring unit) 19, in the case where an instruction has been received from the instructing unit 11 to cause the display apparatus 2 to display the signature window, extracts associated image data G stored in the image data storage unit 18. In the first variation, the image data acquiring unit 19 extracts associated image data G stored in the image data storage unit 18, in the case where the Sign button B illustrated in FIG. 2 has been pressed by the operator. The image data acquiring unit 19 outputs the associated image data G acquired by being extracted from the image data storage unit 18 to the signature window data generating unit 20.

The signature window data generating unit 20 combines the template window data stored in the template data storage unit 15 and the image data G output from the image data acquiring unit 19. As a result of the combining, the signature window data generating unit 20 generates signature window data indicating a signature window on which the image data G is displayed on the background window of the input area IA. The signature window data generating unit 20 outputs the generated signature window data to the signature window display unit 21.

Figure 11:
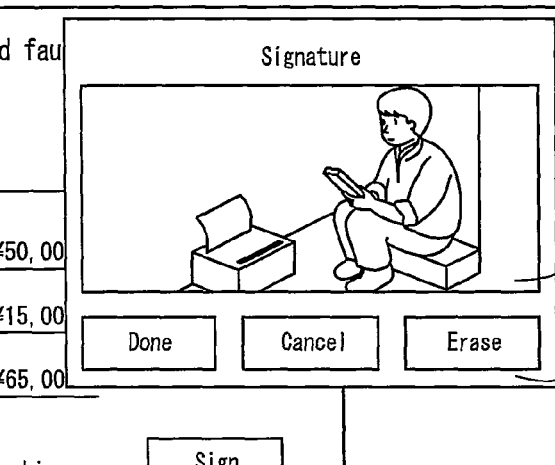
FIG. 11 illustrates an example of a signature window displayed on the confirmation note window.

The signature window display unit 21 causes the display apparatus 2 to display the signature window indicated by the signature window data output from the signature window data generating unit 20. FIG. 11 and FIG. 12 illustrate examples of the signature window S displayed on the confirmation note window T. As illustrated in FIG. 11 and FIG. 12, the signature window S is displayed as a pop-up on the confirmation note window T displayed by the display apparatus 2. Also, the associated image data G is displayed on the background window of the input area IA of the signature window S.

Figure 13:
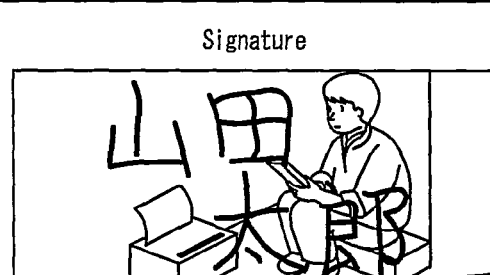
FIG. 13 illustrates an example of the signature window illustrated in FIG. 11 in the case of a user having made a handwritten signature via an input apparatus.

Here, in the case where, for example, a user has made a handwritten signature via the input apparatus 3 by drawing a trajectory using a touch pen in the input area IA of the signature window S, the signature window display unit 21 causes the display apparatus 2 to display the handwritten signature in accordance with the trajectory that the user has drawn in the input area IA of the signature window S. FIG. 13 and FIG. 14 illustrate examples of the signature window S in the case of the user having made a handwritten signature via the input apparatus 3. As illustrated in FIG. 13 and FIG. 14, the handwritten signature "Taro Yamada" is displayed in the input area IA of the signature window S.

Note that in the above, an example is described in which the image data storage unit 18 is provided in the information processing apparatus 1a, but the present invention is not limited to this. For example, an image data storage unit may be provided in a server apparatus that differs in terms of hardware from the information processing apparatus 1a. In this case, the image data acquiring unit 19, in the case where an instruction has been received from the instructing unit 11 to cause the display apparatus 2 to display the signature window, acquires image data stored in the image data storage unit of the server apparatus, by accessing the server apparatus via a network such as the Internet and an Ethernet®.

Second Variation of Signature Window

Figure 15:
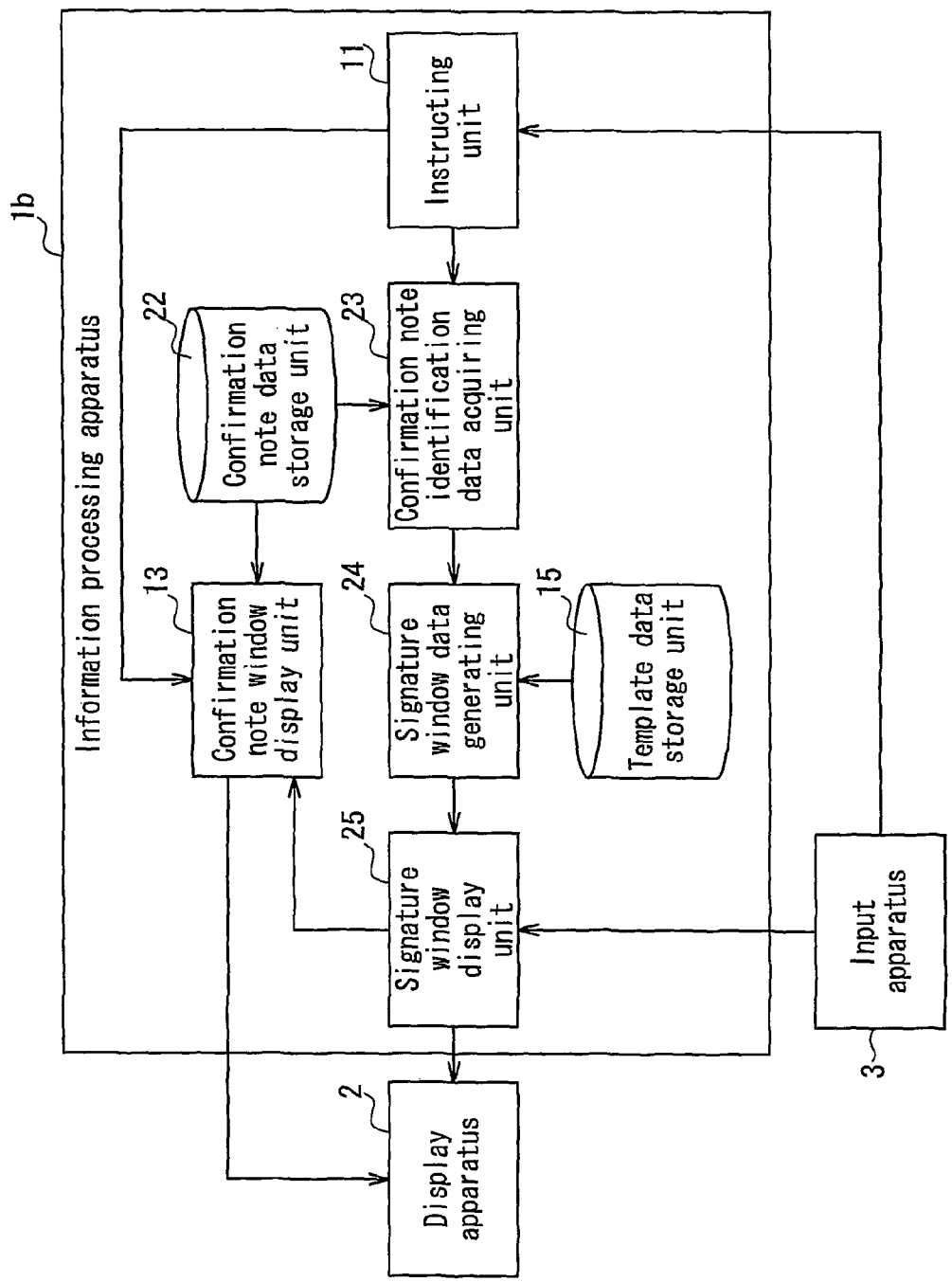
FIG. 15 is a block diagram illustrating a schematic configuration of an information processing apparatus according to a second variation of the present invention.

FIG. 15 is a block diagram illustrating a schematic configuration of an information processing apparatus 1b according to the second variation. That is, the information processing apparatus 1b according to the second variation is provided with an identification data acquiring unit 23, instead of the confirmation note data acquiring unit 14 illustrated in FIG. 1. Also, the information processing apparatus 1b according to the second variation is provided with a confirmation note data storage unit 22, a signature window data generating unit 24 and a signature window display unit 25, instead of the confirmation note data storage unit 12, the signature window data generating unit 16 and the signature window display unit 17 illustrated in FIG. 1. Note that in FIG. 15, the same reference numerals are given to constituent elements having similar functions to FIG. 1, and a detailed description thereof will be omitted.

The confirmation note data storage unit 22 stores confirmation note data that includes confirmation note item data indicating a confirmation note item, and confirmation note content data indicating a confirmation note content corresponding to the confirmation note item. Note that in the second variation, confirmation note identification data (element data) uniquely associated with a confirmation note is inserted into the confirmation note data. The confirmation note identification data is, for example, a symbol pattern, a color pattern, a character pattern, an image pattern, or the like, uniquely associated with the confirmation note.

Figure 17:
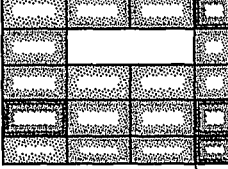
FIG. 17 illustrates an example of a confirmation note window displayed by a display apparatus.

The confirmation note window display unit 13, in the case where an instruction has been received from the instructing unit 11 to display the confirmation note window T, extracts confirmation note data stored in the confirmation note data storage unit 22. The confirmation note window display unit 13 causes the display apparatus 2 to display the confirmation note window T, based on the extracted confirmation note data. FIG. 16 and FIG. 17 illustrate examples of the confirmation note window T displayed by the display apparatus 2. As illustrated in FIG. 16, because confirmation note identification data is inserted into the confirmation note data, confirmation note identification data R that is a symbol pattern is displayed on the confirmation note window T. Also, as illustrated in FIG. 17, because confirmation note identification data is inserted into the confirmation note data, confirmation note identification data R that is a color pattern is displayed on the confirmation note window T.

The confirmation note identification data acquiring unit (data acquiring unit) 23, in the case where an instruction has been received from the instructing unit 11 to cause the display apparatus 2 to display the signature window S, extracts confirmation note data stored in the confirmation note data storage unit 22. In the second variation, the identification data acquiring unit 23 extracts confirmation note data stored in the confirmation note data storage unit 22, in the case where the Sign button B illustrated in FIG. 2 has been pressed by the operator. The identification data acquiring unit 23 acquires confirmation note identification data R inserted into the extracted confirmation note data. The identification data acquiring unit 23 outputs the acquired confirmation note identification data R to the signature window data generating unit 24.

The signature window data generating unit 24 combines the template window data stored in the template data storage unit 15 and the confirmation note identification data R output from the identification data acquiring unit 23. As a result of the combining, the signature window data generating unit 24 generates signature window data indicating a signature window on which the confirmation note identification data R is displayed on the background window of the input area IA. The signature window data generating unit 24 outputs the generated signature window data to the signature window display unit 25.

The signature window display unit 25 causes the display apparatus 2 to display the signature window indicated by the signature window data output from the signature window data generating unit 24. FIG. 18 and FIG. 19 illustrate examples of the signature window S displayed on the confirmation note window T. As illustrated in FIG. 18 and FIG. 19, the signature window S is displayed as a pop-up on the confirmation note window T displayed by the display apparatus 2. Also, the confirmation note identification data R is displayed on the background window of the input area IA of the signature window S.

Figure 20:
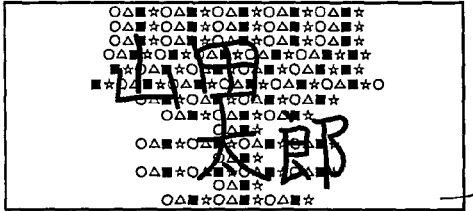
FIG. 20 illustrates an example of the signature window illustrated in FIG. 18 in the case of a user having made a handwritten signature via an input apparatus.
Figure 21:
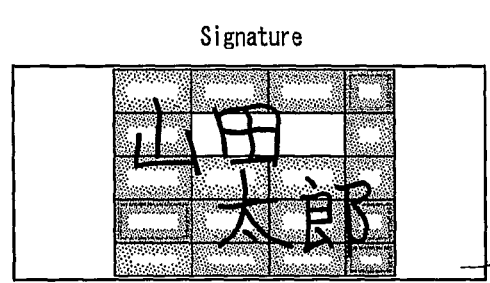
FIG. 21 illustrates an example of the signature window illustrated in FIG. 19 in the case of a user having made a handwritten signature via an input apparatus.

Here, in the case where, for example, a user has made a handwritten signature via the input apparatus 3 by drawing a trajectory using a touch pen in the input area IA of the signature window S, the signature window display unit 25 causes the display apparatus 2 to display the handwritten signature in accordance with the trajectory that the user has drawn in the input area IA of the signature window S. FIG. 20 and FIG. 21 illustrate examples of the signature window S in the case of the user having made a handwritten signature via the input apparatus 3. As illustrated in FIG. 20 and FIG. 21, the handwritten signature "Taro Yamada" is displayed in the input area IA of the signature window S.

Third Variation of Signature Window

Figure 22:
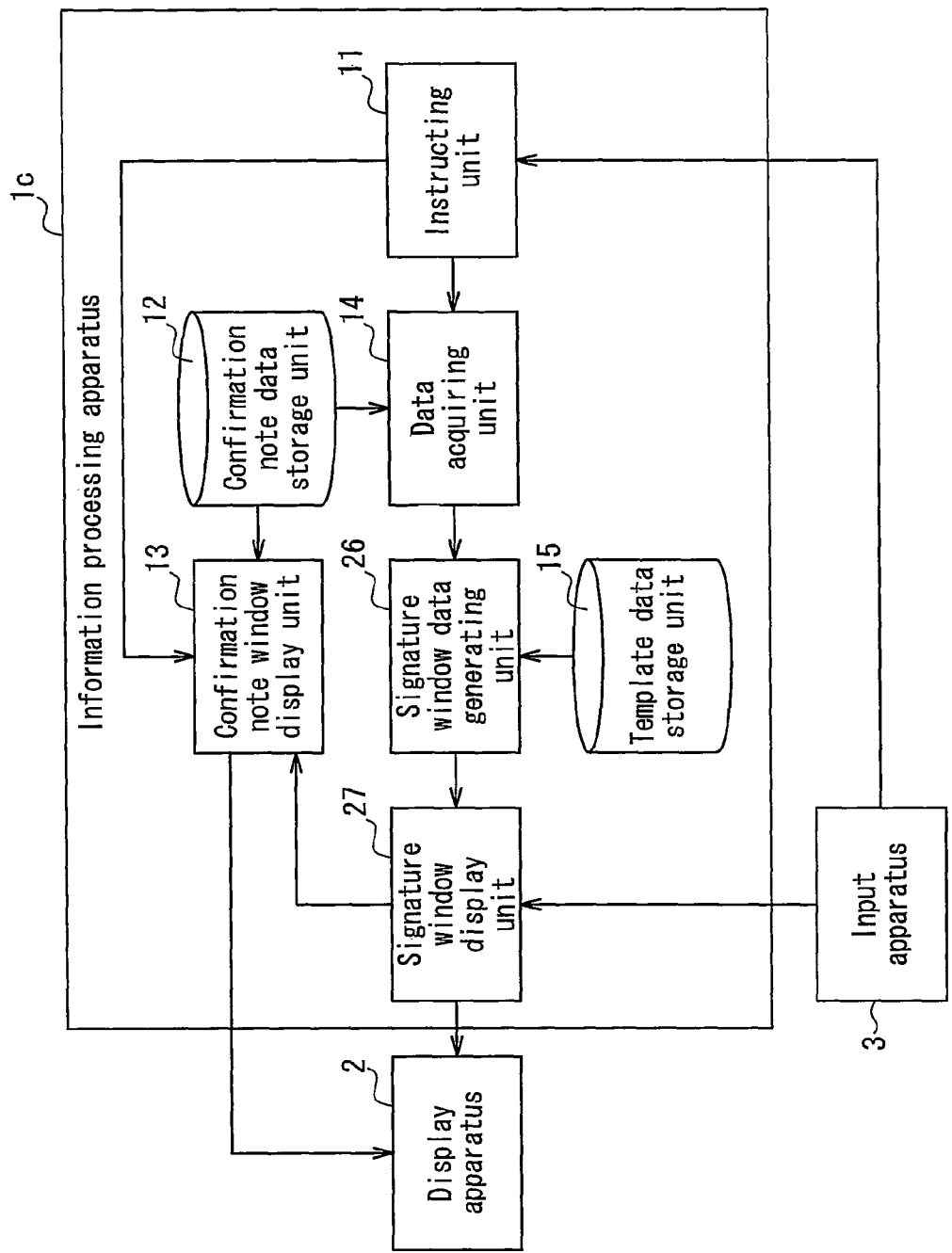
FIG. 22 is a block diagram illustrating a schematic configuration of an information processing apparatus according to a third variation of the present invention.

FIG. 22 is a block diagram illustrating a schematic configuration of an information processing apparatus 1c according to the third variation. That is, the information processing apparatus 1c according to the third variation is provided with a signature window data generating unit 26 and a signature window display unit 27, instead of the signature window data generating unit 16 and the signature window display unit 17 illustrated in FIG. 1. Note that in FIG. 22, the same reference numerals are given to constituent elements having similar functions to FIG. 1, and a detailed description thereof will be omitted.

The signature window data generating unit 26 inserts confirmation note item data and confirmation note content data output from the confirmation note data acquiring unit 14 into the template window data stored in the template data storage unit 15, such that the confirmation note item data and the confirmation note content data are masked. In the third embodiment, the signature window data generating unit 26 inserts both the confirmation note item data "Report Date" and the confirmation note content data "2007/05/16" and the confirmation note item data "Report Number" and the confirmation note content data "0705160011R" into the template window M illustrated in FIG. 3, such that the confirmation note item data and the confirmation note content data are masked. As a result of the inserting, the signature window data generating unit 26 generates signature window data indicating a signature window on which the conformation note item data and the confirmation note content data will be displayed surrounding a written portion of the signature in the case of a handwritten signature having been input via the input apparatus 3. The signature window data generating unit 26 outputs the generated signature window data to the signature window display unit 27.

The signature window display unit 27 causes the display apparatus 2 to display the signature window indicated by the signature window data output from the signature window data generating unit 26. FIG. 23 illustrates an example of the signature window S displayed on the confirmation note window T. As illustrated in FIG. 23, the signature window S is displayed as a pop-up on the confirmation note window T displayed by the display apparatus 2. Note that because the confirmation note item data and the confirmation note content data are masked, the confirmation note item data and the confirmation note content data are not displayed on the background window of the input area IA of the signature window S. In other words, the input area IA of the signature window S illustrated in FIG. 23 has a plain background.

Figure 24:
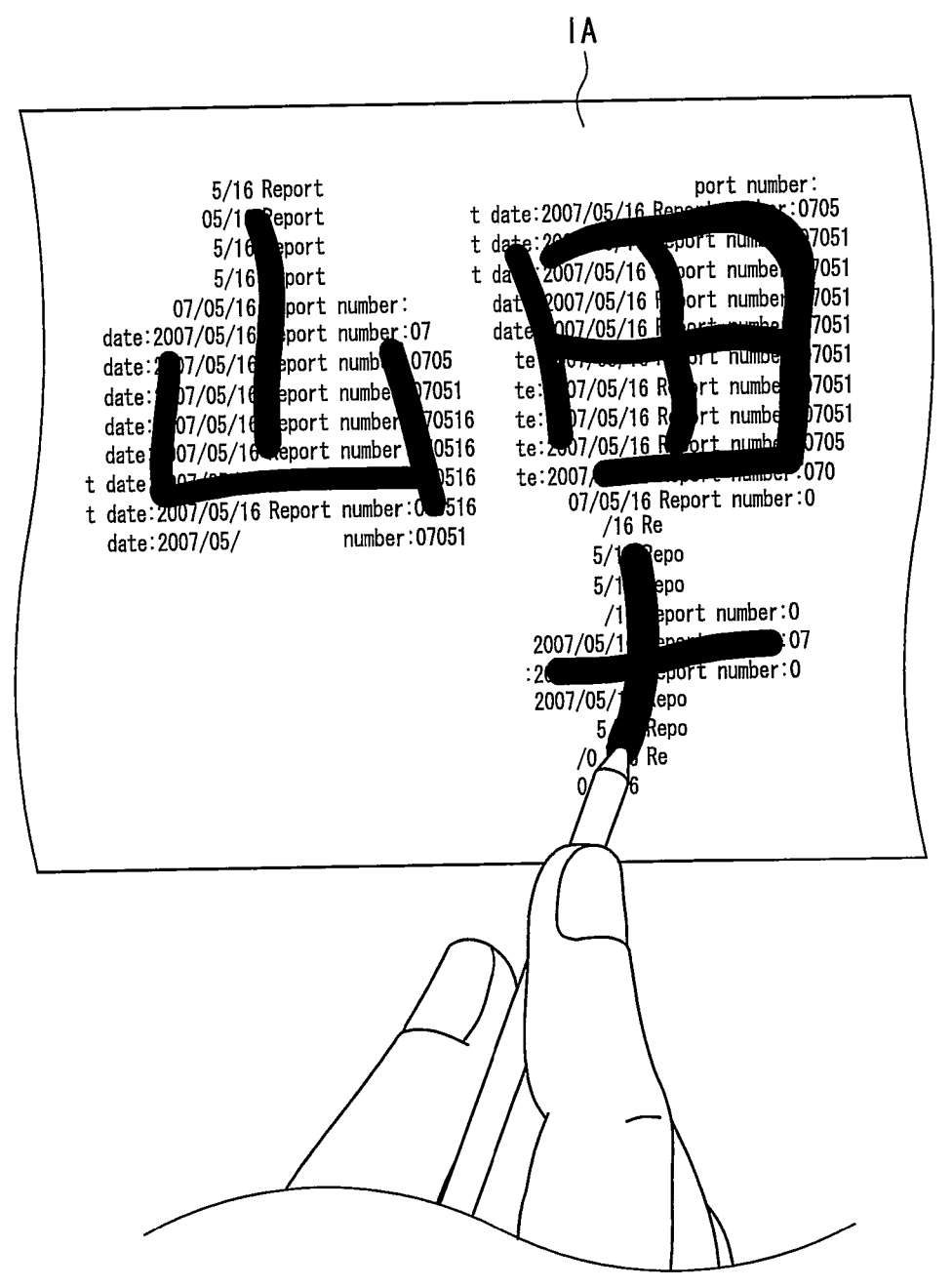

Here, in the case where, for example, a user has made a handwritten signature via the input apparatus 3 by drawing a trajectory using a touch pen in the input area IA of the signature window S, the signature window display unit 27 causes the display apparatus 2 to display the handwritten signature in accordance with the trajectory that the user has drawn in the input area IA of the signature window S. At this time, the signature window display unit 27, as illustrated in FIG. 24, removes the mask surrounding a written portion of the handwritten signature in the case of the user having made a handwritten signature, and causes confirmation note item data and confirmation note content data that were masked to be displayed on the background window of the input area IA. In other words, the signature window display unit 27 removes the mask surrounding the trajectory, in accordance with the trajectory that the user has drawn in the input area IA of the signature window S. Note that a fixed distance from the trajectory that the user has drawn in the input area IA of the signature window S is preset in a memory (not illustrated) as a range for removing the mask. Also, the data displayed surrounding the written portion of the handwritten signature in the case of the user having made a handwritten signature may be the image data G described in the first variation or the confirmation note identification data R described in the second variation, instead of confirmation note item data and confirmation note content data.

Figure 25:
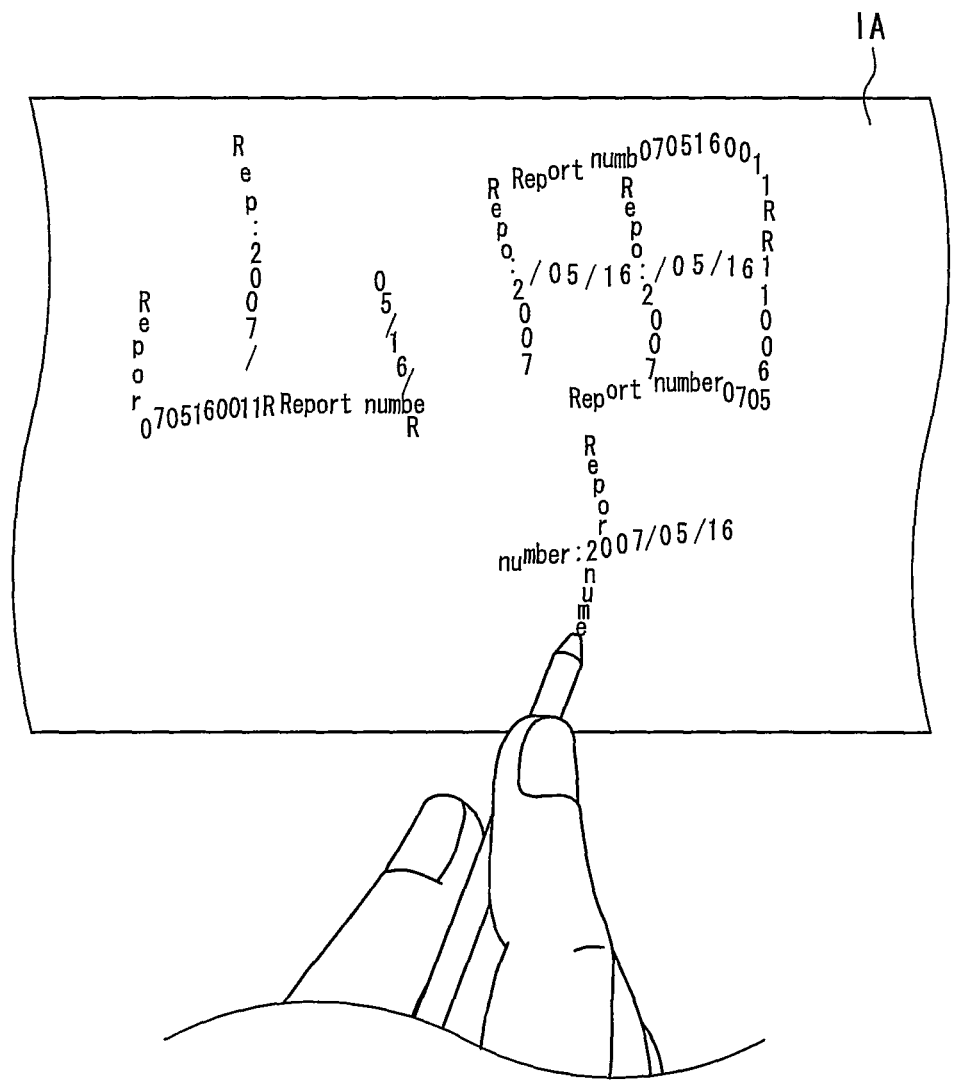
FIG. 25 illustrates an example of an input area of a signature window on which confirmation note item data and confirmation note content data are displayed in a written portion of a handwritten signature in the case of a user having made a handwritten signature via an input apparatus.

Note that in the above, an example is described in which the signature window display unit 27 removes the mask surrounding the written portion of the handwritten signature in the case of the user having made a handwritten signature, and causes confirmation note item data and confirmation note content data that were masked to be displayed on the background window of the input area IA, but the present invention is not limited to this. For example, the signature window display unit 27 may be configured to cause confirmation note item data and confirmation note content data to be displayed in the written portion of the handwritten signature in the case of the user having made a handwritten signature, as illustrated in FIG. 25. In other words, the signature window display unit 27 displays confirmation note item data and confirmation note content data in the written portion of the handwritten signature, in accordance with the trajectory that the user has drawn in the input area IA of the signature window S. Note that confirmation note item data and confirmation note content data are displayed as bitmap data. Also, the data displayed in the written portion of the handwritten signature in the case of the user having made a handwritten signature may be the image data G described in the first variation or the confirmation note identification data R described in the second variation, instead of confirmation note item data and confirmation note content data.

Embodiment 2

In embodiment 1, the case was described where a printer belonging to a user breaks down and the user requests the manufacturer to repair the faulty printer. Specifically, in embodiment 1, the case was described where an operator is dispatched to the user's location from the manufacturer that received the request, and the operator generates a report slip for the user using a mobile terminal, after repairing the faulty printer. In contrast, in embodiment 2, the case where a user purchases a product using a credit card at a given retail outlet will be described. Specifically, in embodiment 2, the case where a salesperson generates a statement slip for the user, using a personal computer, after performing a settlement process with the user's credit card, will be described.

Figure 26:
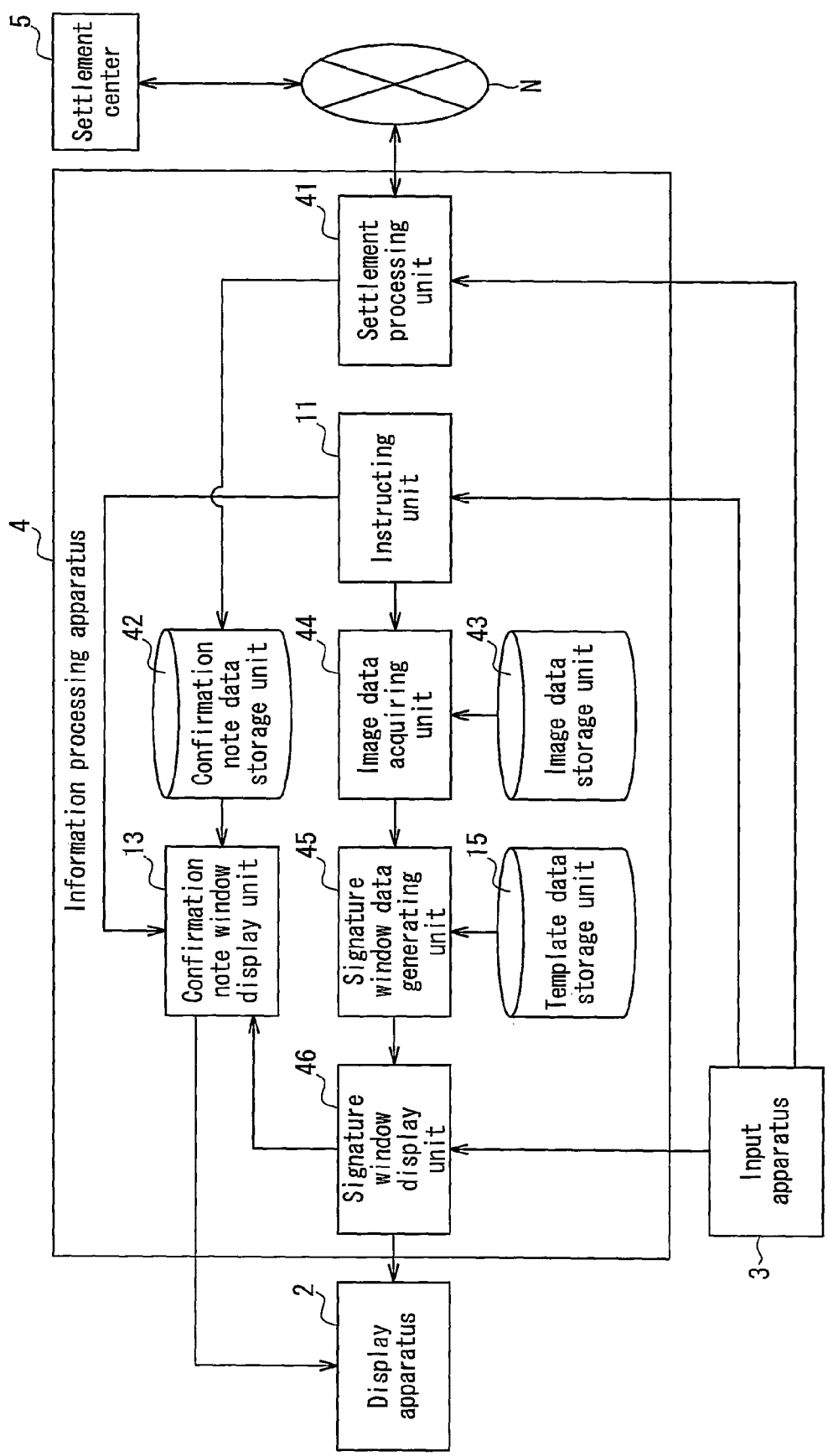
FIG. 26 is a block diagram illustrating a schematic configuration of an information processing apparatus according to a second embodiment of the present invention.

FIG. 26 is a block diagram illustrating a schematic configuration of an information processing apparatus 4 according to the present embodiment. Note that a personal computer according to the present embodiment includes the information processing apparatus 4, the display apparatus 2 and the input apparatus 3 of FIG. 26.

That is, the information processing apparatus 4 according to the present embodiment is connected to a settlement center 5 via a network N such as the Internet or an Ethernet®. Also, the information processing apparatus 4 according to the present embodiment is provided with a settlement processing unit 41 and an image data storage unit 43, in addition to the information processing apparatus 1 illustrated in FIG. 1. Also, the information processing apparatus 4 according to the present embodiment is provided with an image data acquiring unit 44, instead of the confirmation note data acquiring unit 14 illustrated in FIG. 1. Further, the information processing apparatus 4 according to the present embodiment is provided with a confirmation note data storage unit 42, a signature window data generating unit 45 and a signature window display unit 46, instead of the confirmation note storage unit 12, the signature window data generating unit 16 and the signature window display unit 17 illustrated in FIG. 1. Note that the above settlement processing unit 41 is also embodied by a CPU of a computer operating in accordance with a program that realizes the function of this constituent element. Also, in FIG. 26, the same reference numerals are given to constituent elements having similar functions to FIG. 1, and a detailed description thereof will be omitted.

The settlement processing unit 41 reads data from the user's credit card, and transmits the read credit card data to the settlement center 5. Also, the settlement processing unit 41 transmits product purchase data indicating information on the product purchased by the user and the purchase price of the product to the settlement center 5. The settlement center 5 performs the settlement process, based on the credit card data and the product purchase data transmitted from the settlement processing unit 41. In other words, the settlement center 5 performs transfer of an amount that is the purchase price of the product indicated by the product purchase data to a bank account of the retail outlet, and withdrawal of an amount that is the purchase price of the product from a bank account of the user indicated by the credit card data. The settlement processing unit 41 acquires settlement information resulting from the settlement process that the settlement center 5 performed from the settlement center 5, and writes the acquired settlement information to the confirmation note data storage unit 42.

The confirmation note data storage unit 42 stores confirmation note data including confirmation note item data indicating a confirmation note item, and confirmation note content data indicating a confirmation note content corresponding to the confirmation note item. In the present embodiment, confirmation note data indicating a statement slip for a user is stored in the confirmation note data storage unit 42.

Figure 27:
FIG. 27 illustrates an example of a confirmation note window displayed by a display apparatus.

The confirmation note window display unit 13, in the case where an instruction has been received from the instructing unit 11 to display the confirmation note window T, extracts confirmation note data stored in the confirmation note data storage unit 42. The confirmation note window display unit 13 causes the display apparatus 2 to display the confirmation note window T on which the confirmation note is displayed, based on the extracted confirmation note data. FIG. 27 illustrates an example of the confirmation note window T displayed by the display apparatus 2. As illustrated in FIG. 27, the statement slip for the user is displayed on the confirmation note window T. Specifically, the confirmation note items "Settlement Date", "Card Number", "Retail Outlet Name", "Product Name", "Price", "Total Amount", and "Person in Charge" are displayed on the confirmation note window T. Also, the confirmation note contents are respectively displayed on the confirmation note window T in correspondence with the confirmation note items. For example, the confirmation note content "ABC Shopping Center" is displayed in correspondence with the confirmation note item "Retail Outlet Name". Further, a Sign button B and a signature field C are displayed on the confirmation note window T.

Figure 28:
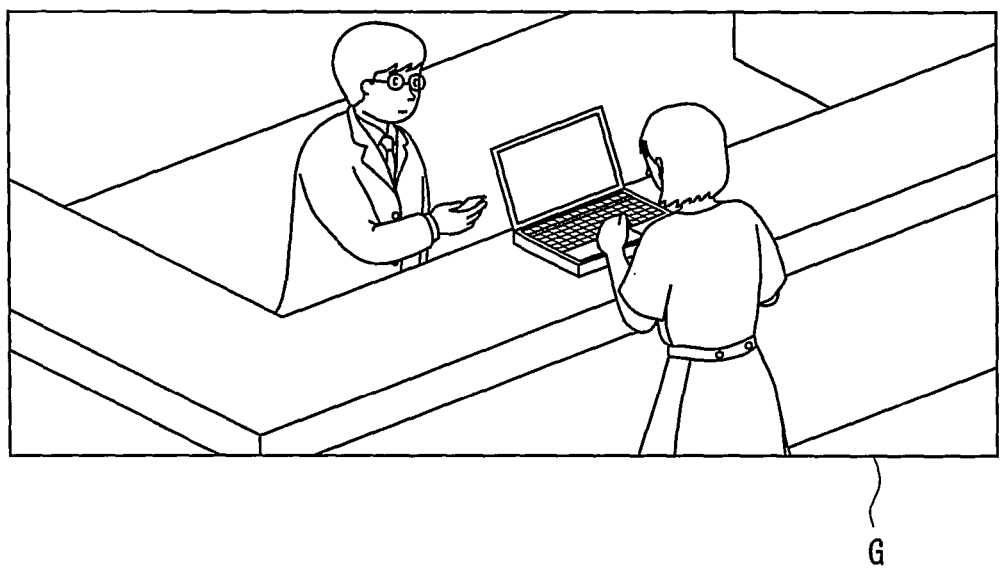
FIG. 28 illustrates an example of associated image data stored in an image data storage unit in the above information processing apparatus.

The image data storage unit 43 stores associated image data indicating a still image associated with a confirmation note indicated by confirmation note data or a user that makes a handwritten signature. FIG. 28 illustrates an example of associated image data G stored in the image data storage unit 43. As illustrated in FIG. 28, associated image data G representing a state where the salesperson is processing the user's credit card using the information processing apparatus 4 is stored in the image data storage unit 43. Note that the associated image data G is not limited to the example illustrated in FIG. 28. For example, the associated image data G may be image data of the product that the user has purchased using the credit card. Also, in the case where a plurality of products are purchased, the associated image data G may be image data that lists all of the purchased products. Also, the associated image data G may be image data of only the most expensive of the purchased products. Further, the associated image data G may be acquired from a server or the like that manages product data.

The image data acquiring unit (data acquiring unit) 44, in the case where an instruction has been received from the instructing unit 11 to cause the display apparatus 2 to display the signature window, extracts associated image data G stored in the image data storage unit 43. In the present embodiment, the image data acquiring unit 44 extracts associated image data G stored in the image data storage unit 43, in the case where the Sign button B illustrated in FIG. 27 is pressed by the salesperson. The image data acquiring unit 44 outputs the associated image data G acquired by being extracted from the image data storage unit 43 to the signature window data generating unit 45.

The signature window data generating unit 45 combines the template window data stored in the template data storage unit 15 and the associated image data G output from the image data acquiring unit 44. As a result of the combining, the signature window data generating unit 45 generates signature window data indicating a signature window on which the associated image data G is displayed on the background window of the input area IA. The signature window data generating unit 45 outputs the generated signature window data to the signature window display unit 46.

Figure 29:
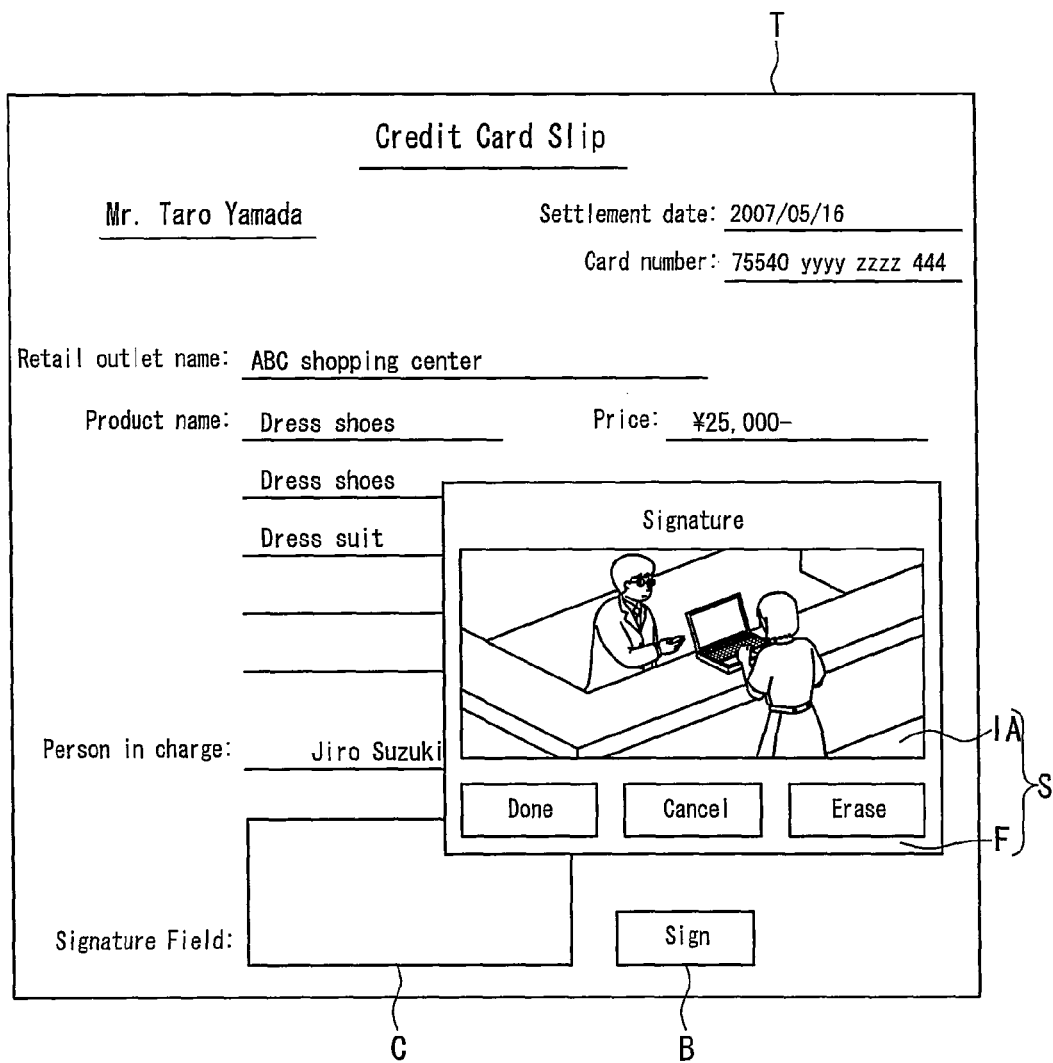
FIG. 29 illustrates an example of a signature window displayed on the above confirmation note window.

The signature window display unit 46 causes the display apparatus 2 to display the signature window indicated by the signature window data output from the signature window data generating unit 45. FIG. 29 illustrates an example of the signature window S displayed on the confirmation note window T. As illustrated in FIG. 29, the signature window S is displayed as a pop-up on the confirmation note window T displayed by the display apparatus 2. Also, the image data G is displayed on the background window of the input area IA of the signature window S.

Figure 30:
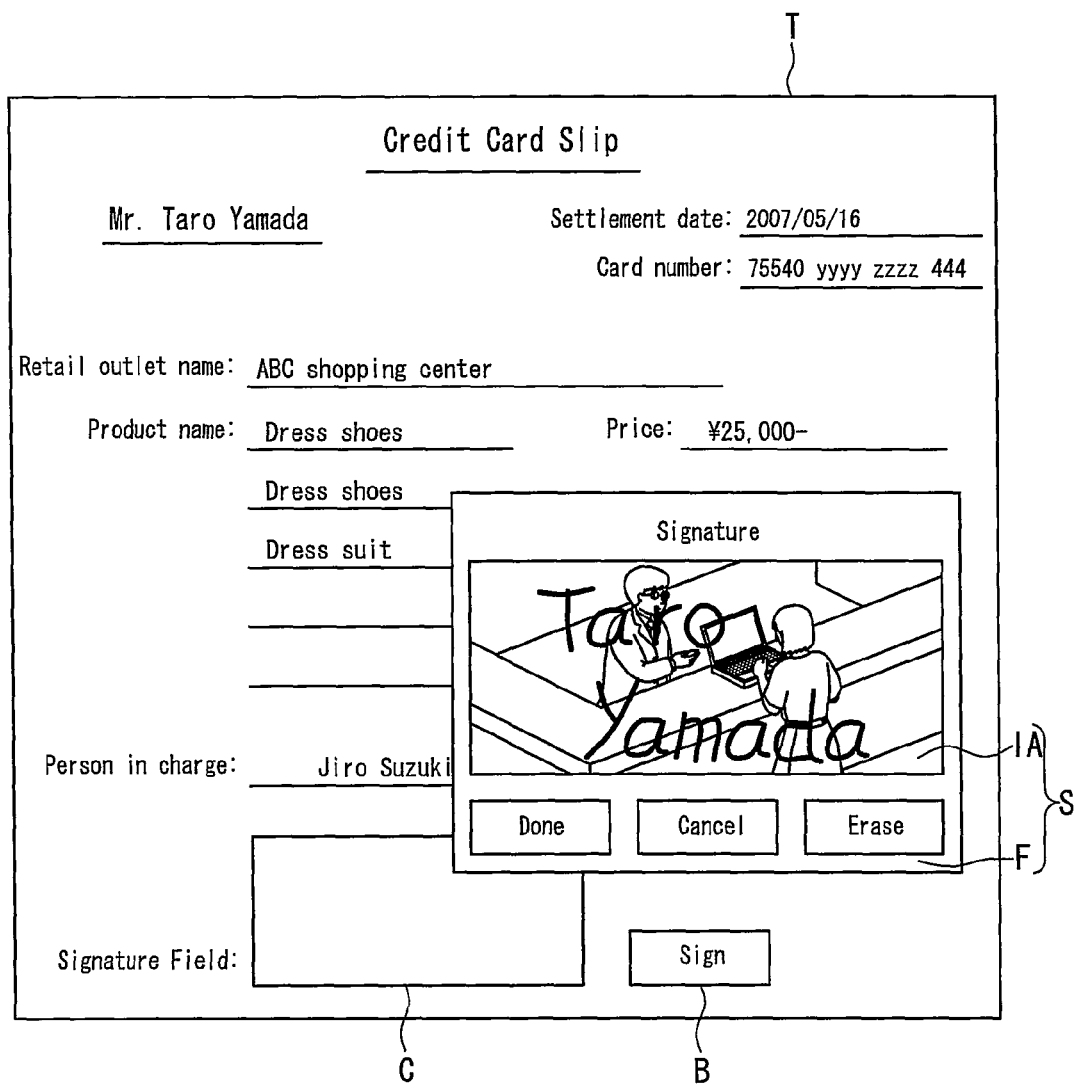
FIG. 30 illustrates an example of the signature window illustrated in FIG. 29 in the case of a user having made a handwritten signature via an input apparatus.

Here, the user, in the case of judging that the contents of the statement slip displayed on the confirmation note window T are correct, makes a handwritten signature via the input apparatus 3, by drawing a trajectory using a touch pen, for example, in the input area IA of the signature window S. In the case where the user has made a handwritten signature via the input apparatus 3, the signature window display unit 46 causes the display apparatus 2 to display the handwritten signature in accordance with the trajectory that the user has drawn in the input area IA of the signature window S. FIG. 30 illustrates an example of the signature window S in the case of the user having made a handwritten signature via the input apparatus 3. As illustrated in FIG. 30, the handwritten signature "Taro Yamada" is displayed in the input area IA of the signature window S.

Figure 31:
FIG. 31 illustrates an example of a confirmation note window in which the user's handwritten signature is combined with a signature field of a statement slip.

Also, the confirmation note window display unit 13, in the case where an instruction has been received from the instructing unit 11 to combine the handwritten signature displayed in the input area IA of the signature window S, combines the salesperson's handwritten signature displayed in the input area IA of the signature window S and the signature field C of the statement slip displayed on the confirmation note window T. In the present embodiment, the confirmation note window display unit 13 combines the salesperson's handwritten signature displayed in the input area IA of the signature window S and the signature field C of the statement slip displayed on the confirmation note window T, in the case where the "Done" button of the signature window S illustrated in FIG. 30 has been pressed by the user or the operator. The confirmation note window display unit 13 causes the display apparatus 2 to display the confirmation note window T on which the user's handwritten signature is combined with the signature field C of the statement slip FIG. 31 illustrates an example of the confirmation note window T in which the salesperson's handwritten signature is combined with the signature field C of the statement slip. As illustrated in FIG. 31, the user's handwritten signature displayed in the input area IA of the signature window S is combined with the signature field C of the confirmation note window T.

As described above, according to the information processing apparatus 4 of the present embodiment, the signature window data generating unit 45, by combining template window data with image data, generates signature window data indicating a signature window S on which image data is displayed on a background window of an input area IA. The signature window display unit 46 causes the display apparatus 2 to display the signature window S indicated by the signature window data. In other words, because image data is displayed on the background window of the input area IA, when a user makes a handwritten signature in the input area IA of the signature window S, the user is able to easily comprehend that this handwritten signature is a once only signature on the confirmation note. That is, the user will feel that there is no danger of a signature portion, in the case of having made a handwritten signature, being saved as electronic data, and the signature portion saved as electronic data being duplicated or edited. Therefore, the psychological resistance of users that make a handwritten signature can be reduced. As a result, it is possible to resolve the concern of users that make a handwritten signature.

Note that in the first and second embodiments, examples were described in which a signature window data generating unit, by combining an input area of a template window indicated by template window data with confirmation note content data, confirmation note identification data or associated image data, generates signature window data indicating a signature window S on which the confirmation note content data, the confirmation note identification data or the associated image data is displayed on a background window of an input area, but the present invention is not limited to this. For example, a signature window data generating unit may generate signature window data indicating a signature window S on which confirmation note content data, confirmation note identification data or associated image data is displayed on at least a portion of the input area.

Also, an example of a confirmation process on a report slip for repair work was described in the first embodiment, and an example of a confirmation process on a statement slip for a product that a user purchased was described in the second embodiment, as examples of the case where a user makes a handwritten signature in an input area of a signature window via an input apparatus, but the present invention is not limited to this. For example, other examples of the case where a user makes a handwritten signature in an input area of a signature window via an input apparatus include a process of receiving a package or mail delivered by courier or post, a process of entering into a contract for a mobile phone or the like, an application process for a service use application or a service subscription application, a confirmation process related to receipt of monies such as an invoice or a receipt, and a process of illustrating acceptance of the terms and conditions accompanying various contracts.

The present invention is not limited to the abovementioned first and second embodiments, and can be variously modified within the scope defined by the claims. That is, an embodiment obtained by combining technical means appropriately modified within the scope defined by the claims is encompassed in the technical scope of the present invention.

As described above, the present invention is useful as an information processing apparatus connected to a display apparatus and an input apparatus, and to which a handwritten signature on a confirmation note displayed by the display apparatus is input via the input apparatus, an information processing method, and an information processing program.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:

1. An information processing apparatus connected to a display apparatus and an input apparatus, and to which a handwritten signature on a confirmation note displayed by the display apparatus is input via the input apparatus, comprising:
   a confirmation note data storage unit that stores confirmation note data indicating the confirmation note;
   a confirmation note window display unit that causes the display apparatus to display a confirmation note window on which the confirmation note is displayed, based on the confirmation note data stored in the confirmation note data storage unit;
   a template data storage unit storing template window data indicating a template window that includes an input area to which the handwritten signature is input via the input apparatus;
   a data acquiring unit that acquires element data of at least a portion of elements forming the confirmation note, or associated image data indicating an image associated with the confirmation note or a user that makes the handwritten signature;
   a signature space generating unit that, by combining the template window with the element data or the associated image data acquired by the data acquiring unit, generates a signature space on which the element data or the associated image data is displayed in at least a portion of the input area; and
   a signature space display unit that causes the display apparatus to display the signature space generated by the signature space generating unit,
   wherein the inputted handwritten signature and the signature space on which the element data or the associated image data is displayed are combined and displayed on the confirmation note window.

2. The apparatus according to claim 1,
   wherein the signature window data generating unit generates signature window data indicating a signature window on which the element data or the associated image data is displayed on a background window of the input area.

3. The apparatus according to claim 1,
   wherein the element data is input via the input apparatus, and is confirmation note content data indicating a content of the confirmation note.

4. The apparatus according to claim 1,
   wherein the element data is inserted into the confirmation note data, and is confirmation note identification data uniquely associated with the confirmation note.

5. The apparatus according to claim 1, further comprising an image data storage unit that stores associated image data indicating an image imaged of a creator of the confirmation note,
   wherein the data acquiring unit acquires the associated image data stored in the image data storage unit.

6. An information processing apparatus connected to a display apparatus and an input apparatus, and to which a handwritten signature on a confirmation note displayed by the display apparatus is input via the input apparatus, comprising:
   a confirmation note data storage unit that stores confirmation note data indicating the confirmation note;
   a confirmation note window display unit that causes the display apparatus to display a confirmation note window on which the confirmation note is displayed, based on the confirmation note data stored in the confirmation note data storage unit;
   a template data storage unit storing template window data indicating a template window that includes an input area to which the handwritten signature is input via the input apparatus;
   a data acquiring unit that acquires element data of at least a portion of elements forming the confirmation note, or associated image data indicating an image associated with the confirmation note or a user that makes the handwritten signature;
   a signature space generating unit that, by inserting the element data or the associated image data acquired by the data acquiring unit into the template window, generates a signature space on which the element data or the associated image data will be displayed in a written portion of the signature or surrounding a written portion of the signature in a case of the handwritten signature having been input via the input apparatus; and
   a signature space display unit that causes the display apparatus to display the signature space generated by the signature space generating unit,
   wherein the inputted handwritten signature and the signature space on which the element data or the associated image data is displayed are combined and displayed on the confirmation note window.

7. The apparatus according to claim 6,
   wherein the element data is input via the input apparatus, and is confirmation note content data indicating a content of the confirmation note.

8. The apparatus according to claim 6,
   wherein the element data is inserted into the confirmation note data, and is confirmation note identification data uniquely associated with the confirmation note.

9. The apparatus according to claim 6, further comprising an image data storage unit that stores associated image data indicating an image imaged of a creator of the confirmation note,
  wherein the data acquiring unit acquires the associated image data stored in the image data storage unit.

10. An information processing method executed by a computer connected to a display apparatus and an input apparatus and to which a handwritten signature on a confirmation note displayed by the display apparatus is input via the input apparatus, comprising:
  a confirmation note window display step in which a confirmation note window display unit provided in the computer causes the display apparatus to display a confirmation note window on which the confirmation note is displayed, based on confirmation note data stored in a confirmation note data storage unit that stores confirmation note data indicating the confirmation note;
  a data acquiring step in which a data acquiring unit provided in the computer acquires element data of at least a portion of elements forming the confirmation note, or associated image data indicating an image associated with the confirmation note or a user that makes the handwritten signature;
  a signature space generating step in which a signature window data generating unit provided in the computer, by combining a template window stored in a template data storage unit storing template window data indicating the template window that includes an input area to which the handwritten signature is input via the input apparatus with the element data or the associated image data acquired in the data acquiring step, generates a signature space on which the element data or the associated image data is displayed in at least a portion of the input area;
  a signature space display step in which a signature window display unit provided in the computer causes the display apparatus to display the signature space generated in the signature space generating step; and
  combining and displaying the inputted handwritten signature and the signature space on which the element data or the associated image data is displayed on the confirmation note window.

11. An information processing method executed by a computer connected to a display apparatus and an input apparatus and to which a handwritten signature on a confirmation note displayed by the display apparatus is input via the input apparatus, comprising:
  a confirmation note window display step in which a confirmation note window display unit provided in the computer causes the display apparatus to display a confirmation note window on which the confirmation note is displayed, based on confirmation note data stored in a confirmation note data storage unit that stores confirmation note data indicating the confirmation note;
  a data acquiring step in which a data acquiring unit provided in the computer acquires element data of at least a portion of elements forming the confirmation note, or associated image data indicating an image associated with the confirmation note or a user that makes the handwritten signature;
  a signature space generating step in which a signature window data generating unit provided in the computer, by inserting the element data or the associated image data acquired in the data acquiring step into a template window stored in a template data storage unit storing template window data indicating the template window that includes an input area to which the handwritten signature is input via the input apparatus, generates a signature space on which the element data or the associated image data will be displayed in a written portion of the signature or surrounding a written portion of the signature in a case of the handwritten signature having been input via the input apparatus;
  a signature space display step in which a signature window display unit provided in the computer causes the display apparatus to display the signature space generated in the signature window data generating step; and
  combining and displaying the inputted handwritten signature and the signature space on which the element data or the associated image data is displayed on the confirmation note window.

12. A non-transitory recording media storing an information processing program for causing a computer connected to a display apparatus and an input apparatus and to which a handwritten signature on a confirmation note displayed by the display apparatus is input via the input apparatus to execute processing comprising:
  a confirmation note window display process of causing the display apparatus to display a confirmation note window on which the confirmation note is displayed, based on confirmation note data stored in a confirmation note data storage unit that stores confirmation note data indicating the confirmation note;
  a data acquiring process of acquiring element data of at least a portion of elements forming the confirmation note, or associated image data indicating an image associated with the confirmation note or a user that makes the handwritten signature;
  a signature space generating process of, by combining a template window stored in a template data storage unit storing template window data indicating the template window that includes an input area to which the handwritten signature is input via the input apparatus with the element data or the associated image data acquired in the data acquiring process, generating a signature space on which the element data or the associated image data is displayed in at least a portion of the input area;
  a signature space display process of causing the display apparatus to display the signature space generated in the signature space generating process; and
  combining and displaying the inputted handwritten signature and the signature space on which the element data or the associated image data is displayed on the confirmation note window.

13. A non-transitory recording media storing an information processing program for causing a computer connected to a display apparatus and an input apparatus and to which a handwritten signature on a confirmation note displayed by the display apparatus is input via the input apparatus to execute processing comprising:
  a confirmation note window display process of causing the display apparatus to display a confirmation note window on which the confirmation note is displayed, based on confirmation note data stored in a confirmation note data storage unit that stores confirmation note data indicating the confirmation note;
  a data acquiring process of acquiring element data of at least a portion of elements forming the confirmation note, or associated image data indicating an image associated with the confirmation note or a user that makes the handwritten signature;
  a signature space generating process of, by inserting the element data or the associated image data acquired in the data acquiring process into a template window stored in a template data storage unit storing template window data indicating the template window that includes an input area to which the handwritten signature is input via the input apparatus, generating a signature space on which the element data or the associated image data will be displayed in a written portion of the signature or surrounding a written portion of the signature in a case of the handwritten signature having been input via the input apparatus;

a signature space display process of causing the display apparatus to display the signature space generated in the signature space generating process; and combining and displaying the inputted handwritten signature and the signature space on which the element data or the associated image data is displayed on the confirmation note window.

* * * * *